US012542349B2

(12) United States Patent
Leung et al.

(10) Patent No.: US 12,542,349 B2
(45) Date of Patent: Feb. 3, 2026

(54) ANTENNA

(71) Applicant: City University of Hong Kong, Kowloon (HK)

(72) Inventors: Kwok Wa Leung, Kowloon (HK); Chen Yang, Kowloon (HK); Kai Lu, Guangzhou (CN)

(73) Assignee: City University of Hong Kong, Kowloon (HK)

( * ) Notice: Subject to any disclaimer, the term of this patent is extended or adjusted under 35 U.S.C. 154(b) by 157 days.

(21) Appl. No.: 18/305,469

(22) Filed: Apr. 24, 2023

(65) Prior Publication Data

US 2023/0387587 A1 Nov. 30, 2023

Related U.S. Application Data

(60) Provisional application No. 63/346,005, filed on May 26, 2022.

(51) Int. Cl.

*H01Q 1/52* (2006.01)
*H01Q 1/48* (2006.01)
*H01Q 9/30* (2006.01)

(52) U.S. Cl.

CPC ............... *H01Q 1/521* (2013.01); *H01Q 1/48* (2013.01); *H01Q 9/30* (2013.01)

(58) Field of Classification Search

CPC ............ H01Q 1/521; H01Q 1/48; H01Q 9/30; H01Q 9/32; H01Q 21/28; H01Q 1/40

See application file for complete search history.

(56) References Cited

U.S. PATENT DOCUMENTS

| | | | | |
|---|---|---|---|---|
| 10,389,021 | B1 | 8/2019 | Thakur | |
| 10,923,808 | B2 * | 2/2021 | Xu | H01Q 9/42 |
| 10,950,933 | B2 | 3/2021 | Xu et al. | |
| 2012/0062437 | A1 * | 3/2012 | Hung | H01Q 5/357 343/799 |
| 2018/0123244 | A1 * | 5/2018 | An | H01Q 1/36 |
| 2020/0395661 | A1 * | 12/2020 | Bai | H01Q 21/28 |
| 2022/0094064 | A1 * | 3/2022 | Ramalingam | H01Q 1/38 |

FOREIGN PATENT DOCUMENTS

| | | | |
|---|---|---|---|
| CN | 113809530 | A | 12/2021 |
| CN | 113889760 | A | 1/2022 |
| EP | 3078125 | B1 | 5/2020 |

OTHER PUBLICATIONS

Isolation Enhancement for MIMO Path antennas sharing a common thick substrate: Using a Dielectric Block to control space wave coupling to cancel surface-wave coupling (Year: 2021).*

(Continued)

*Primary Examiner* — Minh Tran

(74) *Attorney, Agent, or Firm* — Renner, Kenner, Greive, Bobak, Taylor & Weber

(57) ABSTRACT

An antenna includes a plurality of antenna elements each respectively operable as a radiator of electromagnetic waves, and a decoupler arrangement operably coupled with the plurality of antenna elements. The decoupler arrangement is configured to prevent, reduce, or substantially eliminate mutual coupling of at least two of the plurality of antenna elements when at least one of the plurality of antenna elements is operated as radiator.

21 Claims, 25 Drawing Sheets

Dual-Hertzian-dipole model

Dual-port antenna

(56) References Cited

OTHER PUBLICATIONS

X. Chen, S. Zhang, and Q. Li, "A review of mutual coupling in MIMO Systems," IEEE Access, vol. 6, pp. 24706-24719, 2018.
R. Tian, B. K. Lau, and Z. Ying, "Multiplexing efficiency of MIMO antennas," IEEE Antennas Wirel. Propag. Lett., vol. 10, pp. 183-186, 2011.
J. X. Yun and R. G. Vaughan, "Multiple element antenna efficiency and its impact on diversity and capacity," IEEE Trans. Antennas Propag., vol. 60, No. 2, pp. 529-539, Feb. 2012.
A. Kumar, A. Q. Ansari, B. K. Kanaujia, J. Kishor, and L. Matekovits, "A review on different techniques of mutual coupling reduction between elements of any MIMO antenna. part 2: Metamaterials and many more," Radio Sci., vol. 56, No. 3, Mar. 2021.
C. Y. Chiu, C. H. Cheng, R. D. Murch, and C. R. Rowell, "Reduction of mutual coupling between closely-packed antenna elements," IEEE Trans. Antennas Propag., vol. 55, No. 6, pp. 1732-1738, Jun. 2007.
S. Zhang, Z. N. Ying, J. Xiong, and S. L. He, "Ultrawideband MIMO/diversity antennas with a tree-like structure to enhance wideband isolation," IEEE Antennas Wirel. Propag. Lett., vol. 8, pp. 1279-1282, 2009.
S. Zhang, B. K. Lau, Y. Tan, Z. N. Ying, and S. L. He, "Mutual coupling reduction of two PIFAs with a T-shape slot impedance transformer for MIMO mobile terminals," IEEE Trans. Antennas Propag., vol. 60, No. 3, pp. 1521-1531, Mar. 2012.
G. Zhai, Z. N. Chen, and X. Qing, "Enhanced isolation of a closely spaced four-element MIMO antenna system using metamaterial mushroom," IEEE Trans. Antennas Propag., vol. 63, No. 8, pp. 3362-3370, Aug. 2015.
A. Dadgarpour, B. Zarghooni, B. S. Virdee, T. A. Denidni, and A. A. Kishk, "Mutual coupling reduction in dielectric resonator antennas using Metasurface shield for 60-GHz MIMO systems," IEEE Antennas Wirel. Propag. Lett., vol. 16, pp. 477-480, 2017.
F. Yang and Y. Rahmat-Samii, "Microstrip antennas integrated with electromagnetic band-gap (EBG) structures: A low mutual coupling design for array applications," IEEE Trans. Antennas Propag., vol. 51, No. 10, pp. 2936-2946, Oct. 2003.
J.-Y. Lee, S.-H. Kim, and J.-H. Jang, "Reduction of mutual coupling in planar multiple antenna by using 1-D EBG and SRR structures," IEEE Trans. Antennas Propag., vol. 63, No. 9, pp. 4194-4198, Sep. 2015.
S. Ghosh, T.-N. Tran, and T. Le-Ngoc, "Dual-layer EBG-based miniaturized multi-element antenna for MIMO systems," IEEE Trans. Antennas Propag., vol. 62, No. 8, pp. 3985-3997, Aug. 2014.
M. J. Al-Hasan, T. A. Denidni, and A. R. Sebak, "Millimeter-wave compact EBG structure for mutual coupling reduction applications," IEEE Trans. Antennas Propag., vol. 63, No. 2, pp. 823-828, Feb. 2015.
A. A. Ghannad, M. Khalily, P. Xiao, R. Tafazolli, and A. A. Kishk, "Enhanced matching and vialess decoupling of nearby patch antennas for MIMO system," IEEE Antennas Wirel. Propag. Lett., vol. 18, No. 6, pp. 1066-1070, Jun. 2019.
T. K. Roshna, U. Deepak, V. R. Sajitha, K. Vasudevan, and P. Mohanan, "A compact UWB MIMO antenna with reflector to enhance isolation," IEEE Trans. Antennas Propag., vol. 63, No. 4, pp. 1873-1877, Apr. 2015.
D. Wu, S. W. Cheung, Q. L. Li, and T. I. Yuk, "Decoupling using diamond-shaped patterned ground resonator for small MIMO antennas," IET Microw. Antennas Propag., vol. 11, No. 2, pp. 177-183, Jan. 2017.
Y. M. Pan, X. Qin, Y. X. Sun, and S. Y. Zheng, "A simple decoupling method for 5G millimeter-wave MIMO dielectric resonator antennas," IEEE Trans. Antennas Propag., vol. 67, No. 4, pp. 2224-2234, Apr. 2019.
L. Zhao and K.-L. Wu, "A decoupling technique for four-element symmetric arrays with reactively loaded dummy elements," IEEE Trans. Antennas Propag., vol. 62, No. 8, pp. 4416-4421, Aug. 2014.
M.-C. Tang, X. Chen, T. Shi, H. Tu, Z. Wu, and R. W. Ziolkowski, "A compact, low-profile, broadside radiating two-element Huygens dipole array facilitated by a custom-designed decoupling element," IEEE Trans. Antennas Propag., pp. 1-1, 2021.
S.-W. Su, C.-T. Lee, and F.-S. Chang, "Printed MIMO-antenna system using neutralization-line technique for wireless USB-dongle applications," IEEE Trans. Antennas Propag., vol. 60, No. 2, pp. 456-463, Feb. 2012.
Y. Wang and Z. Du, "A wideband printed dual-antenna with three neutralization lines for mobile terminals," IEEE Trans. Antennas Propag., vol. 62, No. 3, pp. 1495-1500, Mar. 2014.
J. Sui and K.-L. Wu, "A self-decoupled antenna array using inductive and capacitive couplings cancellation," IEEE Trans. Antennas Propag., vol. 68, No. 7, pp. 5289-5296, Jul. 2020.
S.-C. Chen, Y-S. Wang, and S.-J. Chung, "A decoupling technique for increasing the port isolation between two strongly coupled antennas," IEEE Trans. Antennas Propag., vol. 56, No. 12, pp. 3650-3658, Dec. 2008.
H. Meng and K.-L. Wu, "An LC decoupling network for two antennas working at low frequencies," IEEE Trans. Microw. Theory Tech., vol. 65, No. 7, pp. 2321-2329, Jul. 2017.
L. Sun, Y. Li, and Z. Zhang, "Decoupling between extremely closely spaced patch antennas by mode cancellation method," IEEE Trans. Antennas Propag., vol. 69, No. 6, pp. 3074-3083, Jun. 2021.
K.-L. Wu, C. Wei, X. Mei, and Z.-Y. Zhang, "Array-antenna decoupling surface," IEEE Trans. Antennas Propag., vol. 65, No. 12, pp. 6728-6738, Dec. 2017.
S. Xu, M. Zhang, H. Wen, and J. Wang, "Deep-subwavelength decoupling for MIMO antennas in mobile handsets with singular medium," Sci. Rep., vol. 7, No. 1, p. 12162, Dec. 2017.
Si, H. Jiang, X. Lv, and J. Ding, "Broadband extremely close-spaced 5G MIMO antenna with mutual coupling reduction using metamaterial-inspired superstrate," Opt. Express, vol. 27, No. 3, p. 3472, Feb. 2019.
M. Li, M. Y. Jamal, L. Jiang, and K. L. Yeung, "Isolation enhancement for MIMO patch antennas sharing a common thick substrate: using a dielectric block to control space-wave coupling to cancel surface-wave coupling," IEEE Trans. Antennas Propag., vol. 69, No. 4, pp. 1853-1863, Apr. 2021.
F. Liu, J. Guo, L. Zhao, G.-L. Huang, Y. Li, and Y. Yin, "Ceramic superstrate-based decoupling method for two closely packed antennas with cross-polarization suppression," IEEE Trans. Antennas Propag., vol. 69, No. 3, pp. 1751-1756, Mar. 2021.
M. Li and S. Cheung, "Isolation enhancement for MIMO dielectric resonator antennas using dielectric superstrate," IEEE Trans. Antennas Propag., pp. 1-1, 2020.
X. Chen, P. Wang, Y. Shao, and H. Jin, "Gradient relative permittivity superstrate for decoupling of two closely-located dual-polarized slot antennas," IEEE Trans. Antennas Propag., pp. 1-1, 2021.
H. Lin, Q. Chen, Y. Ji, X. Yang, J. Wang, and L. Ge, "Weak-field-based self-decoupling patch antennas," IEEE Trans. Antennas Propag., vol. 68, No. 6, pp. 10, 2020.
K.-L. Wong, M.-F. Jian, C.-J. Chen, and J.-Z. Chen, "Two-port same-polarized patch antenna based on two out-of-phase TM 10 modes for access-point MIMO antenna application," IEEE Antennas Wirel. Propag. Lett., vol. 20, No. 4, pp. 572-576, Apr. 2021.
K.-L. Wong, J.-Z. Chen, and W.-Y. Li, "Four-port wideband annular-ring patch antenna generating four decoupled waves for 5G multi-input-multi-output access points," IEEE Trans. Antennas Propag., vol. 69, No. 5, pp. 2946-2951, May 2021.
M. Simeoni, R. Cicchetti, A. Yarovoy, and D. Caratelli, "Plastic-based supershaped dielectric resonator antennas for wide-band applications," IEEE Trans. Antennas Propag., vol. 59, No. 12, pp. 4820-4825, Dec. 2011.
A. Petosa, Dielectric Resonator Antenna Handbook. Norwood, MA: Artech House, 2007.

* cited by examiner

ANTENNA

TECHNICAL FIELD

The invention relates to an antenna. The antenna may be used in multi-input-multi-output (MIMO) systems.

BACKGROUND

Multi-input-multi-output (MIMO) technology can be used to enhance robustness and/or data rate of a communication system. In a MIMO system, mutual coupling between antenna elements may be undesirable as it may reduce the communication reliability when the MIMO system is used for diversity applications and/or may reduce the channel capacity when the MIMO system is used for multiplexing applications.

SUMMARY OF THE INVENTION

In a first aspect, there is provided an antenna comprising: a plurality of (i.e., two or more) antenna elements each respectively operable as a radiator of electromagnetic waves, and a decoupler arrangement operably coupled with the plurality of antenna elements. The decoupler arrangement is configured to prevent, reduce, or substantially eliminate mutual coupling of at least two of the plurality of antenna elements when at least one of the plurality of antenna elements is operated as radiator. The plurality of antenna elements are electrical conductors. In some embodiments, at least two of the plurality of antenna elements are simultaneously operable as radiators. In some embodiments, at least two of the plurality of antenna elements are selectively operable as radiator (i.e., at least two of the plurality of antenna elements do not operate as radiators at the same time). In some embodiments, the plurality of antenna elements are independently operable.

Optionally, the plurality of antenna elements have substantially the same shape and/or the same size and/or are made of the same material(s). Optionally, the plurality of antenna elements have substantially the same construction (e.g., in terms of shape, size, and material(s)). For example, the plurality of antenna elements may each respectively be shaped as: a cuboid, a cube, a right prism (polygonal prism, e.g., rectangular prism, rhombic prism, trapezoidal prism, pentagonal prism, hexagonal prism, etc.), a right cylinder (e.g., circular cylinder, elliptic cylinder, oblong cylinder, obround cylinder, oval cylinder, etc.), etc. In some embodiments, the antenna elements are in the form of rods, which may be solid or hollow.

Optionally, the plurality of antenna elements are monopole antenna elements each respectively operable as a monopole radiator.

Optionally, the decoupler arrangement is configured to prevent, reduce, or substantially eliminate mutual coupling of all of the plurality of antenna elements when one or more of the plurality of antenna elements are operated as radiator of electromagnetic waves. The decoupler arrangement may also help to shape the radiation pattern of the antenna.

Optionally, the decoupler arrangement comprises a dielectric decoupler arrangement. The dielectric decoupler arrangement may be made of one or more dielectric materials. The one or more dielectric materials may include solid material(s) and/or liquid material(s). If the one or more dielectric materials include liquid material(s), the liquid material(s) may be supported or held by suitable structure(s).

The dielectric decoupler arrangement may provide one or more boundaries operable to scatter electromagnetic waves provided by the plurality of antenna elements such that: for each respective one of the plurality of antenna elements, when the antenna element operates as radiator of electromagnetic waves, the dielectric decoupler arrangement defines one or more respective neutral locations that are less or substantially not susceptible to the corresponding electromagnetic waves provided by the radiator. The respective neutral location(s) may be caused by destructive interference of (i) the electromagnetic waves directly provided by the radiator and (ii) the electromagnetic waves provided by the radiator and subsequently scattered by the dielectric decoupler arrangement. Each of the respective neutral location(s) may also be referred to as "electric field valley" or "field valley", which has a weakened or substantially reduced electric field compared to other locations when a corresponding antenna element operates as radiator. As a result, the dielectric decoupler arrangement defines multiple such neutral locations, and the plurality of antenna elements of the antenna are disposed at these neutral locations. In some embodiments, when the dielectric decoupler arrangement (or the antenna) is arranged in air, the one or more boundaries may be one or more dielectric-air boundaries.

Optionally, the dielectric decoupler arrangement comprises a dielectric block that: receives or substantially encloses the plurality of antenna elements, and provides the one or more boundaries. In some embodiments, the dielectric block is disposed, shaped, and/or sized to prevent, reduce, or substantially eliminate mutual coupling of at least two of the plurality of antenna elements when at least one of the plurality of antenna elements is operated as radiator. In some embodiments, the dielectric block is disposed, shaped, and/or sized to prevent, reduce, or substantially eliminate mutual coupling of all of (e.g., between every two of) the plurality of antenna elements when one or more (e.g., all) of the plurality of antenna elements are operated as radiator of electromagnetic waves.

Optionally, the dielectric block comprises a body and one or more holes formed in the body. The one or more holes receive the plurality of antenna elements. The one or more holes may be blind-hole(s).

Optionally, the one or more holes comprises a plurality of holes each receiving a respective one of the plurality of antenna elements, and the plurality of holes are disposed at the neutral locations. The holes may be blind-holes. The shape of each respective one of the holes may correspond to the shape of the corresponding antenna element it receives (e.g., same shape, and same size or different sizes).

Optionally, the plurality of holes are arranged on an imaginary circle (i.e., a circular path) in plan view. In other words, the plurality of holes are angularly spaced apart on the imaginary circle in plan view. In some embodiments, in plan view, the plurality of holes are angularly spaced apart generally evenly on the imaginary circle. In some embodiments, the body defines a center that generally coincides with the center of the imaginary circle, and the plurality of holes are generally equidistant from the center defined by the body.

Optionally, the body is shaped as: a cuboid, a cube, a right prism (polygonal prism, e.g., rectangular prism, rhombic prism, trapezoidal prism, pentagonal prism, hexagonal prism, etc.), a right cylinder (e.g., circular cylinder, elliptic cylinder, oblong cylinder, obround cylinder, oval cylinder, etc.), etc. In some embodiments, the body is shaped as a right rectangular prism. In some embodiments, the body is shaped as a right rhombus prism. In some embodiments, the body is shaped as a right 6-sided polygonal prism. Optionally, the body is rotationally symmetric (i.e., with an order of rotational symmetry of at least 2) and/or reflectively symmetric.

Optionally, the dielectric block (including the body and the holes) is rotationally symmetric (i.e., with an order of rotational symmetry of at least 2). In some embodiments, the dielectric block has a 90-degree rotation symmetry. In some embodiments, the dielectric block has a 180-degree rotation symmetry.

Optionally, the dielectric block (including the body and the holes) is reflectively symmetric. Optionally, the body consists of (only) two portions or halves disposed about a plane of symmetry, and at least one of the plurality of holes is formed in each respective one of the two portions or halves. Optionally, the two portions or halves are respectively shaped as: a cuboid, a cube, a right prism (polygonal prism, e.g., rectangular prism, rhombic prism, trapezoidal prism, pentagonal prism, hexagonal prism, etc.), a right cylinder half (e.g., circular half, elliptic half, oblong half, obround half, oval half, etc.), etc. In some embodiments, the two portions or halves are each respectively shaped as a right squared or rectangular prism. In some embodiments, the two portions or halves in the form of right prisms are each respectively shaped such that in plan view the two portions or halves in the form of right prisms each respectively generally tapers to narrow towards the plane of symmetry. The tapering can be but need not be strictly linear. For example, the two portions or halves are shaped as two like right trapezoidal prisms, with the short side faces of the trapezoidal prisms being coincident with the plane of symmetry.

In some embodiments, the two portions or halves are each respectively shaped such that in plan view the two portions or halves each respectively generally tapers to narrow away from the plane of symmetry. The tapering can be but need not be strictly linear. For example, the two portions or halves are shaped as two like triangular prisms, with one lateral face of one triangular prism and another one lateral face of another triangular prism are coincident with the plane of symmetry.

Optionally, the dielectric block is both rotationally symmetric and reflectively symmetric.

Optionally, the dielectric block further comprises a through-hole formed in the body and arranged generally centrally of the body, and the plurality of holes are disposed around the through-hole. The through-hole does not receive any antenna element. In plan view, the through-hole defines a center and the plurality of holes may be generally equidistant from the center of the through-hole. In some embodiments, the dielectric block may further comprise one or more further holes, which may or may not be through-holes.

In some embodiments, the plurality of antenna elements comprises at least, or consist of only, two antenna elements, and the dielectric block is rotationally symmetric and reflectively symmetric. The dielectric block comprises: a body and two holes formed in the body and arranged on an imaginary circle in plan view. Each of the two holes receives a respective one of the two antenna elements. Optionally, the body consists of two halves disposed about a plane of symmetry, each of the two halves respectively includes one of the two holes, and in plan view the two halves each respectively generally tapers to narrow towards the plane of symmetry. The tapering can be but need not be strictly linear. For example, the two portions or halves are shaped as two like right trapezoidal prisms, with the short side faces of the trapezoidal prisms being coincident with the plane of symmetry.

In some embodiments, the plurality of antenna elements comprises at least, or consist of only, four antenna elements, and the dielectric block is rotationally symmetric and reflectively symmetric. The dielectric block comprises: a body, a through-hole formed in the body and arranged generally centrally of the body, and four holes formed in the body. The four holes are arranged on an imaginary circle and around the through-hole in plan view, and each of the four holes receives a respective one of the four antenna elements. Optionally, the body consists of two halves disposed about a plane of symmetry, and each of the two halves respectively includes two of the four holes and half of the through-hole. Optionally, the body is shaped as a right squared or rectangular prism, which, in plan view, has a first face diagonal and a second face diagonal. In plan view, two of the four antenna elements may be disposed on the first face diagonal and another two of the four antenna elements may be disposed on the second face diagonal. Optionally, the through-hole is shaped as a right squared or rectangular prism, which, in plan view, has a third face diagonal arranged at an acute angle to the first face diagonal and a fourth face diagonal arranged at an acute angle to the second face diagonal. Optionally, the third face diagonal is arranged at about 45 degrees to the first face diagonal and/or the fourth face diagonal arranged at about 45 degrees to the second face diagonal.

Optionally, the dielectric block is additively manufactured (e.g., 3D printed).

Optionally, the antenna further comprises a ground plane. The ground plane is made of metallic material(s) such as aluminum, copper, etc. The ground plane may be in the form of a plate or disc, which may be rounded or circular. Optionally, the dielectric decoupler arrangement, or the dielectric block, is arranged on or above the ground plane, and the plane of symmetry is generally perpendicular to the ground plane. Optionally, the ground plane is rotationally symmetric and/or reflectively symmetric. Optionally, the dielectric block is disposed generally centrally of (i.e., at or near the center of) the ground plane. Optionally, the plurality of antenna elements extend generally perpendicular to the ground plane.

Optionally, the antenna further comprises a plurality of feed ports each for a respective one of the antenna elements. As such, the antenna may be a multi-port antenna. For example, if the antenna has two antenna elements, the antenna may be a dual-port antenna with two feed ports each for a respective antenna elements. For example, if the antenna has four antenna elements, the antenna may be a quad-port antenna with four feed ports each for a respective antenna elements. The plurality of feed ports may be arranged on a side of the ground plane opposite to the side of the dielectric decoupler arrangement or the dielectric block.

In some examples, each of the plurality of feed ports may respectively be provided a respective RF connector, e.g., SMA connector, SMP connector, N connector, SMB connector, etc. Optionally, each of the plurality of antenna elements is also provided by a respective one of the RF connector. For example, each RF connector may include an inner connector and an outer conductor arranged at least partly around the inner conductor, and the plurality of antenna elements may correspond to the inner conductors of the RF connectors.

Optionally, the antenna is configured to operate at 5G Frequency Range 1 (FR1) band, such as 3.3 GHz to 3.7 GHz. In some examples, the antenna is operable only at the 5G Frequency Range 1 (FR1) band. In some examples, the antenna is operable not only at the 5G Frequency Range 1 (FR1) band, but also at other frequency, frequencies, or frequency band(s).

In some embodiments, the antenna can be operated as a transmit antenna. In some embodiments, the antenna can be operated as a receive antenna. In some embodiments, the antenna can be operated as a transceiver antenna (e.g., transmit and receive using different antenna elements).

In some embodiments, the antenna is operable to provide a generally quasi-boresight radiation pattern.

In some embodiments, the antenna is operable to provide a generally boresight radiation pattern.

In a second aspect, there is provided a device comprising one or multiple ones of the antenna of the first aspect. In some examples, the device may be a communication device that can perform, at least, wireless communication. In some examples, the device may be an IoT device, a satellite communication device, etc. The device may be a multiple-in multiple-out (MIMO) antenna device. The device may be a portable or handheld device.

In a third aspect, there is provided a multiple-in multiple-out (MIMO) antenna system comprising one or multiple ones of the antenna of the first aspect.

In a fourth aspect, there is provided a communication system comprising one or multiple ones of the antenna of the first aspect. The communication system may be a multiple-in multiple-out (MIMO) communication system. The communication system may be operable to communicate using 5G communication protocol(s).

In a fifth aspect, there is provided a communication device comprising one or multiple ones of the antenna of the first aspect. The communication device may be a multiple-in multiple-out (MIMO) communication device. The communication device may be operable to communicate using 5G communication protocols. The communication device may be a mobile or portable device.

In a sixth aspect, there is provided a dielectric block of the antenna of the first aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. For example, when a value is modified by terms of degree, such as "about", such expression may include the stated value ±15%, ±10%, ±5%, ±2%, or ±1%.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Figure 27:
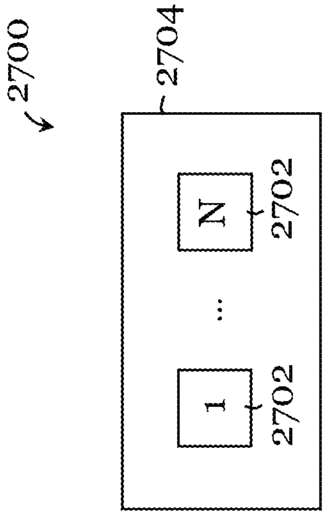
FIG. 27 is a high-level block diagram of an antenna of the invention.

FIG. 27 shows a high-level block diagram of an antenna 2700 of the invention. The antenna 2700 includes N (N≥2) antenna elements 2702 and a decoupler arrangement 2704 operable coupled with the antenna elements 2702.

Each of the antenna elements 2702 may respectively be operable as a radiator of electromagnetic waves. The antenna elements 2702 are electrical conductors. In some implementations, at least two of the antenna elements 2702 can operable as radiators simultaneously. In some implementations, at least two of the antenna elements 2702 can operable as radiators selectively (e.g., one operate as radiator at a time). The antenna elements 2702 may be operable independently. The respective shape and/or size of the antenna elements 2702 may be the same or different. The antenna elements 2702 may respectively be made of the same material(s) or different materials. In some examples, the antenna elements 2702 have substantially the same construction (e.g., in terms of shape, size, and material(s)). In some embodiments, the antenna elements 2702 may each respectively be shaped as: a cuboid, a cube, a right prism (polygonal prism, e.g., rectangular prism, rhombic prism, trapezoidal prism, pentagonal prism, hexagonal prism, etc.), a right cylinder (e.g., circular cylinder, elliptic cylinder, oblong cylinder, obround cylinder, oval cylinder, etc.), etc. In one example, the antenna elements are in the form of rods, which may be solid or hollow, and made of metallic material(s). In some embodiments, the antenna elements 2702 may be monopole antenna elements each respectively operable as a monopole radiator.

The decoupler arrangement 2704 is configured to prevent, reduce, or substantially eliminate mutual coupling of at least two of the antenna elements 2702 when at least one of the antenna elements 2702 is operated as radiator of electromagnetic waves. In some embodiments, the decoupler arrangement 2704 is configured to prevent, reduce, or substantially eliminate mutual coupling of all of antenna elements 2702 when one or more of the antenna elements 2702 are operated as radiator of electromagnetic waves. In some embodiments, the decoupler arrangement 2704 may be configured to further facilitate shaping of radiation pattern of the antenna 2700.

Preferably, the decoupler arrangement 2704 is a dielectric decoupler arrangement, i.e., constructed or made of dielectric material(s), which may include solid material(s) and/or liquid material(s). The dielectric decoupler arrangement may provide one or more boundaries operable to scatter electromagnetic waves provided by the antenna elements 2702 (when any of them operate as radiator) such that for each respective antenna element 2702: when the antenna element 2702 operates as radiator of electromagnetic waves, the dielectric decoupler arrangement defines one or more respective neutral locations that are less or substantially not susceptible to the corresponding electromagnetic waves provided by the radiator. These neutral location(s) may be created due to destructive interference of (i) the electromagnetic waves directly provided by the radiator (direct path) and (ii) the electromagnetic waves provided by the radiator and subsequently scattered by the dielectric decoupler arrangement (scattered path). Each of such neutral location may be referred to as "electric field valley" or "field valley", which has a weakened or substantially reduced (or even cancelled/zero) electric field compared to other locations when the corresponding antenna element 2702 operates as radiator. As when each respective antenna element 2702 operates as radiator at least one neutral location will be defined by the decoupler arrangement 2704, the decoupler arrangement 2704 defines multiple neutral locations for the multiple (N) antenna elements 2702. The antenna elements 2702 of the antenna 2700 may be disposed at or near these neutral locations for isolation or decoupling. If the dielectric decoupler arrangement (or the antenna 2700) is arranged in air, the one or more boundaries may be one or more dielectric-air boundaries. If the dielectric decoupler arrangement (or the antenna 2700) is arranged in another medium, the one or more boundaries may be one or more dielectric-another medium boundaries.

In some embodiments, the decoupler arrangement 2704 includes a dielectric block. The dielectric block receives or substantially encloses the plurality of antenna elements, and provides the one or more boundaries. The dielectric block is configured (e.g., disposed, shaped, and/or sized) to prevent, reduce, or substantially eliminate mutual coupling of at least two of the antenna elements 2702 when at least one of the antenna elements 2702 is operated as radiator of electromagnetic waves. In some embodiments, the dielectric block is configured (e.g., disposed, shaped, and/or sized) to prevent, reduce, or substantially eliminate mutual coupling of all of antenna elements 2702 when one or more of the antenna elements 2702 are operated as radiator of electromagnetic waves.

In some embodiments, the dielectric block includes a body and one or more holes formed in the body. The hole(s), e.g., blind-hole(s), receive the antenna elements 2702. In some embodiments, multiple holes, e.g., blind-holes, are formed in the body and each of the holes receive a respective antenna element 2702 at or near the neutral locations. The shape of each hole may correspond to the shape of the corresponding antenna element 2702 it receives (e.g., same shape, and same size or different sizes).

The body of the dielectric block can be shaped as, e.g.: a cuboid, a cube, a right prism (polygonal prism, e.g., rectangular prism, rhombic prism, trapezoidal prism, pentagonal prism, hexagonal prism, etc.), a right cylinder (e.g., circular cylinder, elliptic cylinder, oblong cylinder, obround cylinder, oval cylinder, etc.), etc. In some embodiments, the body may define a center and the holes may be generally equidistant from and angularly distributed about the center defined by the body. The body may be rotationally symmetric (i.e., with an order of rotational symmetry of at least 2) and/or reflectively symmetric. The holes and hence the antenna elements 2702 may be arranged on an imaginary circle (i.e., a circular path) in plan view, being angularly spaced apart on the imaginary circle in plan view. The angular spacing may be even or uneven.

The dielectric block (including the body, the holes formed in the body, and other feature(s) if any) may be rotationally symmetric (i.e., with an order of rotational symmetry of at least 2) and/or reflectively symmetric.

In terms of the rotation symmetry, the dielectric block may have a 90-degree rotation symmetry, a 120-degree rotation symmetry, a 180-degree rotation symmetry, etc.

In terms of the reflection symmetry, the dielectric block may consist of two portions or halves disposed about a plane of symmetry. In some embodiments, the body may consist of two portions or halves disposed about the plane of symmetry and each of the two portions or halves include respective hole(s). The two portions or halves of the body can respectively be shaped as: a cuboid, a cube, a right prism (polygonal prism, e.g., rectangular prism, rhombic prism, trapezoidal prism, pentagonal prism, hexagonal prism, etc.), a right cylinder half (e.g., circular half, elliptic half, oblong half, obround half, oval half, etc.), etc.

In some embodiments, the dielectric block may also a through-hole formed in the body and arranged generally centrally of the body. The through-hole may not receive any antenna element and may serve to provide one or more boundaries operable to scatter electromagnetic waves provided by the antenna elements 2702. The holes receiving the antenna elements 2702 may be disposed around the through-hole and may be generally equidistant from the center of the through-hole. In some embodiments, the dielectric block may include further structure coupled to the body or void (opening, hole, etc.) formed in the body. The dielectric block may be additively made.

Although not illustrated in FIG. 27, the antenna 2700 may also include a ground plane made of metallic material(s) such as aluminum, copper, etc. The ground plane may be in the form of a plate or disc (e.g., rounded or circular), or may be arranged on a substrate. The ground plane supports the decoupler arrangement 2704. In embodiments in which the decoupler arrangement 2704 includes a dielectric block that is reflectively symmetric about a plane of symmetry, such plane of symmetry is generally perpendicular to the ground plane. The ground plane itself may be rotationally symmetric and/or reflectively symmetric. The dielectric decoupler arrangement or the dielectric block may be disposed generally centrally of (i.e., at or near the center of) the ground plane, and the antenna elements 2702 may extend generally perpendicular to the ground plane. The antenna 2700 preferably includes multiple feed ports each for a respective antenna element 2702. As such, the antenna 2700 may be referred to as a multi-port antenna, which is particularly suited for MIMIO applications. The feed ports may be arranged on a side of the ground plane opposite to the side of the decoupler arrangement or the dielectric block.

The antenna 2700 may be configured to be particularly suitable for operation at particular frequency, frequencies, or frequency band(s). For example, the antenna 2700 may be configured to operate at, at least, the 5G Frequency Range 1 (FR1) band, such as 3.3 GHz to 3.7 GHz. The antenna 2700 may be configured to provide various radiation patterns. For example, the antenna 2700 may be operable to provide a generally quasi-boresight radiation pattern or a generally boresight radiation pattern. Depending on implementations, the antenna 2700 may be operated as a transmit antenna, a receive antenna, or a transceiver antenna (e.g., transmit and receive using different antenna elements 2702).

The following disclosure provides some example embodiments of the invention. The following disclosure broadly concerns reducing mutual coupling between two or more antenna elements in an antenna using a decoupler arrangement.

Some example embodiments more specifically concern reducing mutual coupling between two or more antenna elements that are operable as monopole radiators, using a dielectric block that receives, covers, or substantially encloses the monopole radiators. In these example embodiments, the reduction of the mutual coupling can be achieved by optimizing the shape and/or size of the dielectric block. When the antenna with the dielectric block is placed in air, the dielectric block provide optimized dielectric-air boundary (DAB) for the antenna elements to facilitate generation of "electric field valleys", or simply "field valleys", where the electric field strength is relatively weak, when the antenna elements operate as radiators. By arranging the antenna elements of the antenna in these field valleys, the antenna elements can be isolated. In these example embodiments, within the dielectric decoupler, the field distribution can be controlled to generate field valleys using the dielectric-air boundary. This may provide flexibility in arranging the feed ports hence the port separation in the antenna, which makes it suitable for use in a MIMO antenna system. In some embodiments, the dielectric block also facilitates miniaturizing the antenna and shaping the radiation pattern of each the antenna (e.g., of each of the antenna elements) to obtain desirable radiation patterns (e.g., quasi-boresight patterns). The resulting antenna can be made relatively compact.

The following provides further details on the operating principle of the dielectric decoupler arrangement, and some example antenna embodiments (a dual-port antenna and a quad-port antenna).

Figure 1:
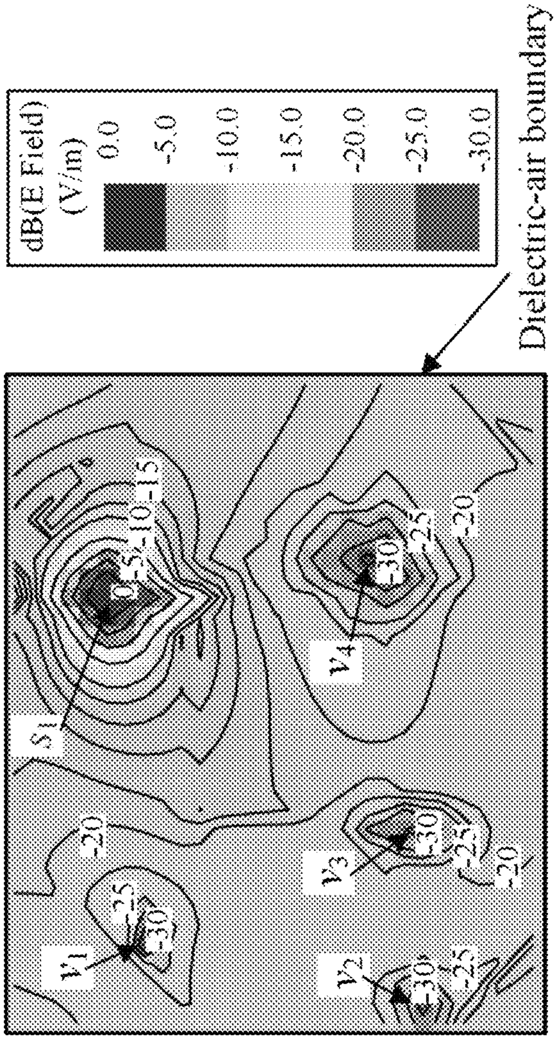
FIG. 1 is a schematic diagram illustrating a decoupling principle using a dielectric-air boundary in some embodiments of the invention.

FIG. 1 illustrates the operating principle of a dielectric decoupler arrangement in some embodiments of the invention. In FIG. 1, the dielectric decoupler arrangement includes a dielectric block enclosing source point $s_1$. Incident electromagnetic waves radiate freely from the source point $s_1$, and the magnitude of the incident electromagnetic waves decays monotonically as the traveling distance increases (away from the source point). Due to the presence of the dielectric block, which in this example is placed in air, the electromagnetic waves are scattered by the one or more dielectric-air boundaries provided by the dielectric block, and a scattered field distribution is formed. The scattered field distribution is determined by the location of the source point $s_1$ and the shape of the one or more dielectric-air boundaries, and thus the scattered field distribution can be controlled by design. According to the superposition principle, the total electric fields (sum of the incident waves and scattered waves) may form a pattern with several valleys or valley regions ($v_1$, $v_2$, . . . , $v_N$). In the valley regions, the incident waves and the scattered waves add up destructively and as a result reduced or little (or even no) energy is coupled to these valleys from the source $s_1$. Based on this observation and finding, the inventors of the present invention have devised that: when multiple antenna elements are arranged in a rotationally symmetric way inside a rotationally symmetric dielectric decoupler, their mutual coupling could be reduced or minimized. The inventors of the present invention have realized one condition is that when one antenna element of the antenna is excited to operate as radiator, valleys need to be formed in other symmetrically-disposed antenna elements of the antenna. Further related details will be provided below.

Figure 2:
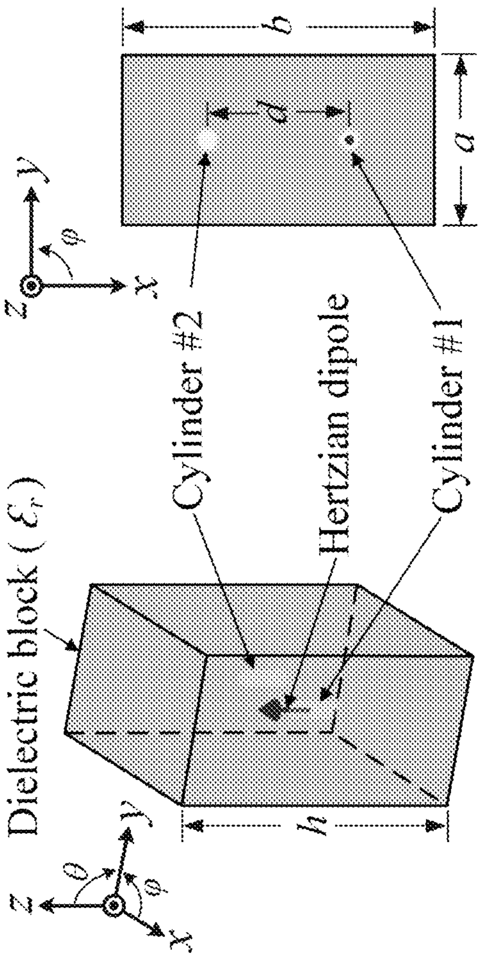
FIG. 2 is a schematic diagram illustrating configuration of a Hertzian dipole in a rectangular dielectric block with two cylindrical regions (one including the Hertzian dipole)

FIG. 2 shows the configuration of a Hertzian dipole in a rectangular dielectric block, for studying the influence of the dielectric-air boundary on the electric field distribution. As shown in FIG. 2, the Hertzian dipole is placed in the rectangular dielectric block with a dielectric constant $\varepsilon_r$=10. The width, length, and height of the dielectric block are a, b, and h, respectively. Two symmetrical cylindrical regions or cylinders #1 and #2 (white areas) spaced by distance d (center-to-center) are selected to evaluate the electric field distribution. In this example, the Hertzian dipole is arranged in cylinder #1.

Three cases with different separation distances d (Case I: d=8 mm, Case II: d=12 mm, and Case III: d=16 mm) are studied to show the flexibility of the above design.

Figure 3:
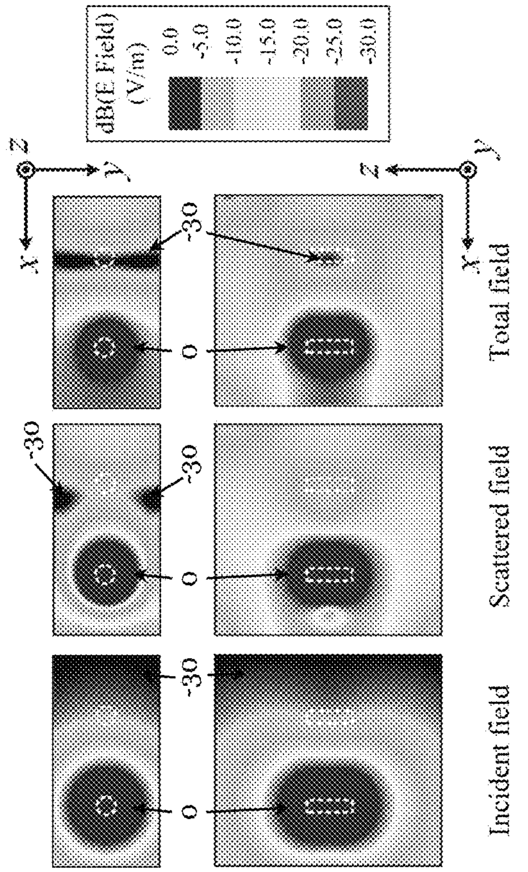
FIG. 3 is a plot illustrating normalized complex electric field distributions (incident, scattered, and total electric field distributions, in xy-plane and xz-plane) of an excited Hertzian dipole in the dielectric block of FIG. 2 (separation distance d between cylindrical regions=16 mm) at 3.5 GHz.

Take d=12 mm (0.14$\lambda_o$) as an example. FIG. 3 shows the normalized complex electric field distributions of an excited Hertzian dipole in the dielectric block, which particularly shows the incident, scattered, and total electric field distributions in the center cutting planes (xy-plane and xz-plane) at 3.5 GHz when d=12 mm. The amplitude value of the complex electric field is selected to evaluate the field distribution, which is an averaged value over all phases. For the incident field distribution, the strong electric field can be observed in cylinder #2 when the dipole in cylinder #1 is excited (cylinders #1 and #2 are symmetrically-disposed). Scattered fields are generated and controlled by the dielectric-air boundary. As shown in FIG. 3, the dielectric decoupler can be suitable shaped and sized to provide one or more suitable dielectric-air boundaries such that the scattered field and the incident field can be made to cancel each other in cylinder #2, thereby forming a field valley in cylinder #2. Similarly, due to the symmetry, a field valley appears around cylinder #1 when a dipole arranged in cylinder #2 is excited. Although not specifically illustrated the other two cases (Case I: d=8 mm, and Case III: d=16 mm) are also studied to locate their symmetrical field valleys. Table I lists the parameter values of the dual-Hertzian-dipole model of FIG. 2.

TABLE I

Dimensions of dual-Hertzian-dipole model (of the examples of FIGS. 2 and 5) and corresponding dual-port antenna (of the example in FIG. 5) (units: mm)

| | Dual-Hertzian-dipole model | | | Dual-port antenna | |
|---|---|---|---|---|---|
| Case | a | b | h | $h_d$ | $h_r$ |
| Case I (d = 8 mm) | 14 | 23 | 38 | 19 | 10.1 |
| Case II (d = 12 mm) | 14 | 28 | 30 | 15 | 10.8 |
| Case III (d = 16 mm) | 14 | 33.5 | 27.2 | 13.6 | 11 |

Figure 4:
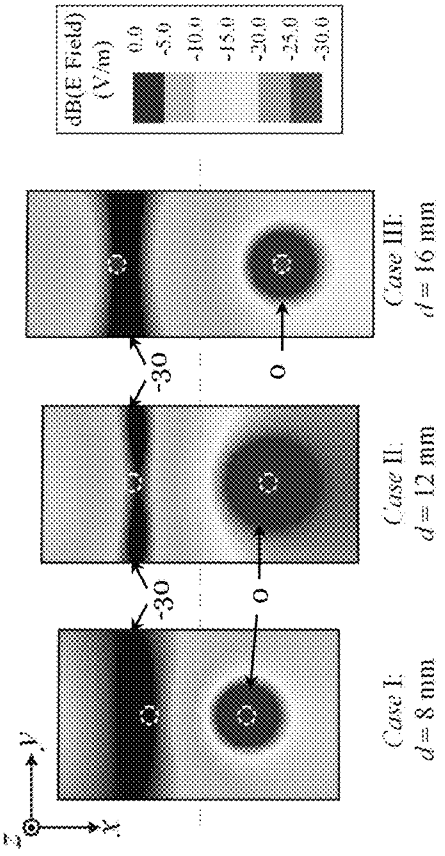
FIG. 4 is a plot illustrating normalized total complex electric field distributions (in xy-plane) of an excited Hertzian dipole in the dielectric block of FIG. 2, for three different separation distances d between the two cylindrical regions (Case I: d=8 mm, Case II: d=12 mm, Case III: d=16 mm)

FIG. 4 shows the normalized total complex electric field distributions of the xy-planes for the three cases with different separation distances d. As shown in FIG. 4, field valleys can be observed in the symmetrical regions, for the cases with different separation distances d. Based on these findings, it can be determined that by suitable designing the dielectric decoupler (e.g., its shape and/or size), symmetrical field valleys can be generated for different separation distances d. This increases the design flexibility of the multi-port antenna with decoupler arrangement.

Figure 5:
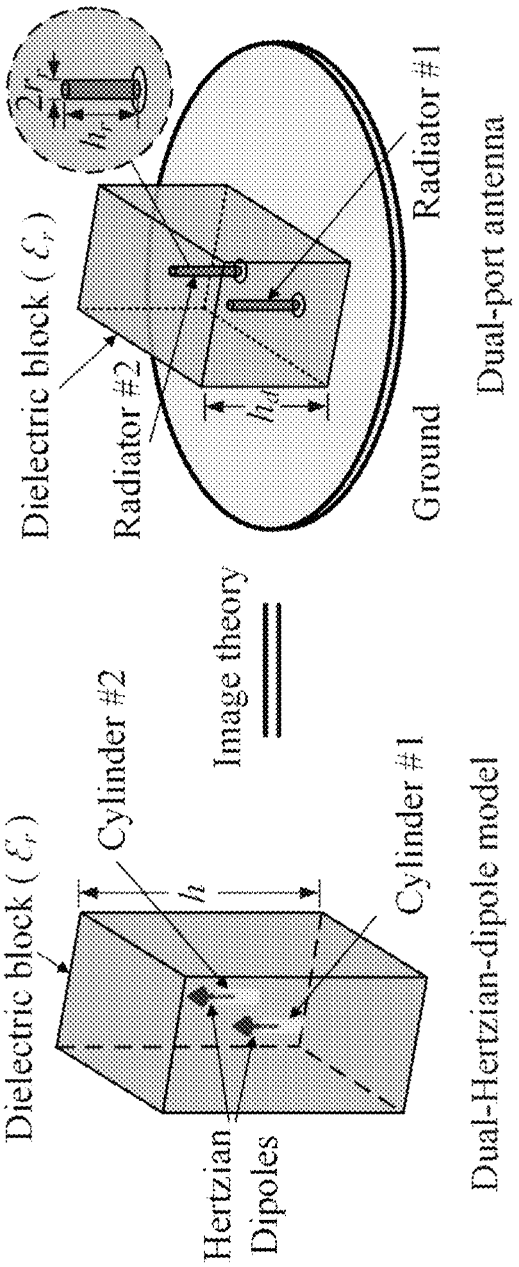
FIG. 5 is a schematic diagram illustrating a dual-Hertzian-dipole model and a corresponding dual-port antenna.

FIG. 5 illustrates a dual-Hertzian-dipole model (same as the one in FIG. 2) and a corresponding dual-port antenna, to show the conversion from the dual-Hertzian-dipole model to the dual-port antenna. In FIG. 5, the ideal Hertzian dipoles in the dual-Hertzian-dipole model are converted to ground-backed monopoles in a dual-port antenna, based on the image theory. In other words, take the dual-port antenna as an example, two monopole radiators with height $h_r$ and radius $r_r$ substitute the dipoles in the dual-Hertzian-dipole model. In this example, for the dual-port antenna, $r_r$=0.635 mm and $g_r$=40 mm. Due to the presence of the ground made of metallic material(s), the height h of the dielectric decoupler is halved (compared to the dielectric block in the dual-Hertzian-dipole model) while other dimensions remain unchanged. In this way, a corresponding dual-port antenna can be obtained from the dual-Hertzian dipole model. Table I lists the parameter values of the dual-Hertzian-dipole model and the dual-port antenna of the example of FIG. 5. This method may also be applied to a/other multi-port antenna.

Figure 6:
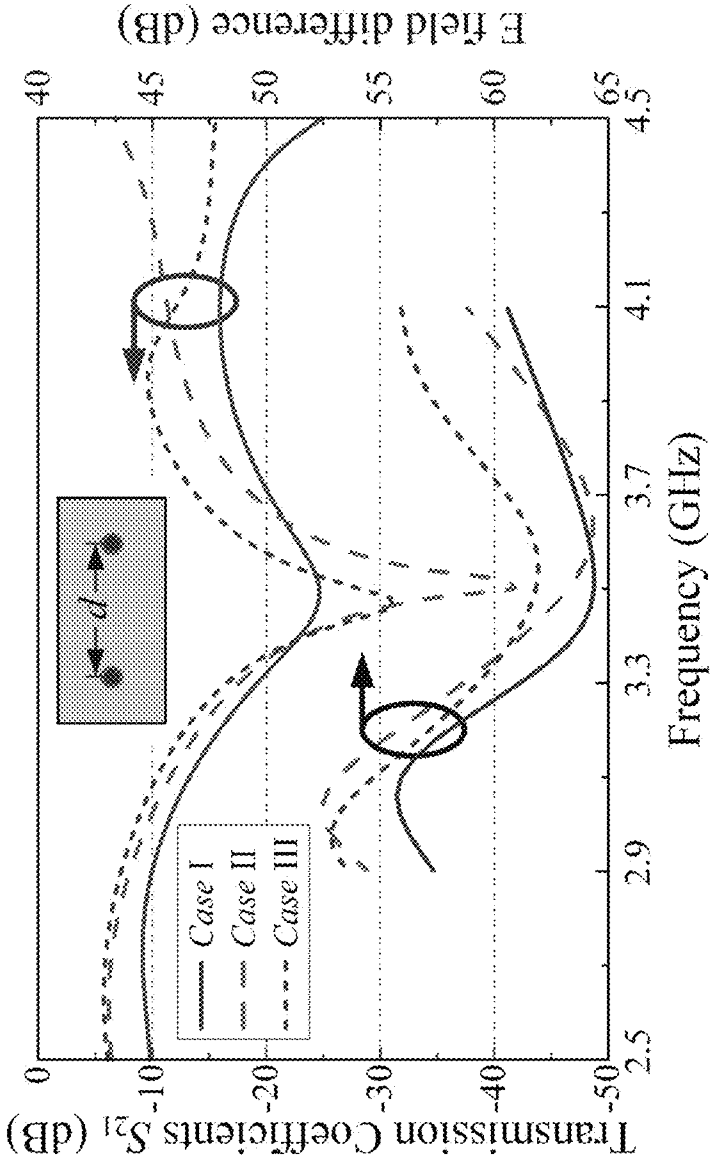
FIG. 6 is a graph showing transmission coefficients $S_{21}$ of the dual-port antenna of FIG. 5 and electric field differences of the dual-Hertzian-dipole model of FIG. 5 at different frequencies, for three different separation distances d between the two radiators/the two Hertzian-dipoles (Case I: d=8 mm, Case II: d=12 mm, Case III: d=16 mm)

FIG. 6 shows the mutual couplings $S_{21}$ of the dual-port antenna of FIG. 5 in the three cases I, II, and III. As shown in FIG. 6, in all three cases, the isolations of the two ports (each corresponding to a respective antenna element) exceed 25 dB at 3.5 GHz. The results indicate that the rectangular dielectric decoupler can facilitate port isolation.

FIG. 6 also shows the electric field difference between cylinders #1 and #2 of the corresponding Hertzian-dipole model of FIG. 5. The electric field difference in the two cylinders #1 and #2 can be evaluated using the field calculator. To obtain accurate electric field difference results, cylinders #1 and #2 are set to the same dimensions as the monopole radiators for each of the three cases. As shown in FIG. 6, significant dips of electric field difference can be observed at around 3.5 GHz for each case. These trends are generally consistent with the mutual couplings $S_{21}$ results. This verifies the basic decoupling principle of arranging other radiator(s) symmetrically in field valley(s) of an excited radiator can provide good port isolations.

The above findings indicate that the decoupling operation principle can be applied to a multi-port antenna (N-port antenna, N≥2).

Following from the above, a dual-port decoupling example is now provided. A dual-port decoupled antenna for MIMO applications is presented, optimized, fabricated, and measured. Its MIMO performance is also discussed.

Figure 7B:
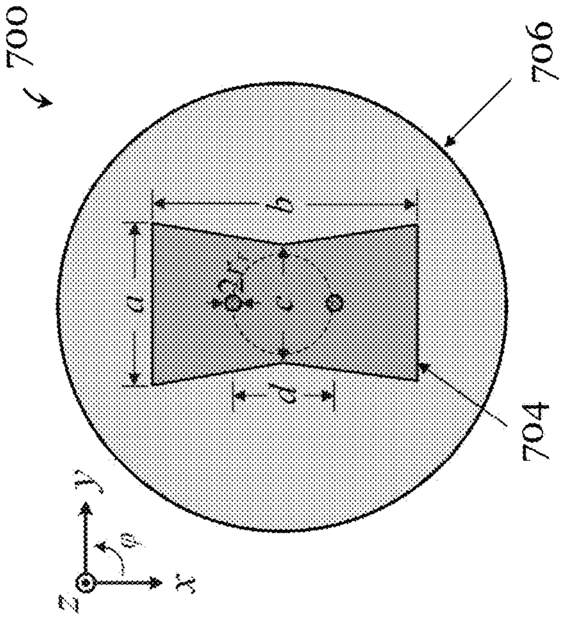
FIG. 7B is a schematic diagram (plan view) of the dual-port antenna of FIG. 7A.
Figure 7A:
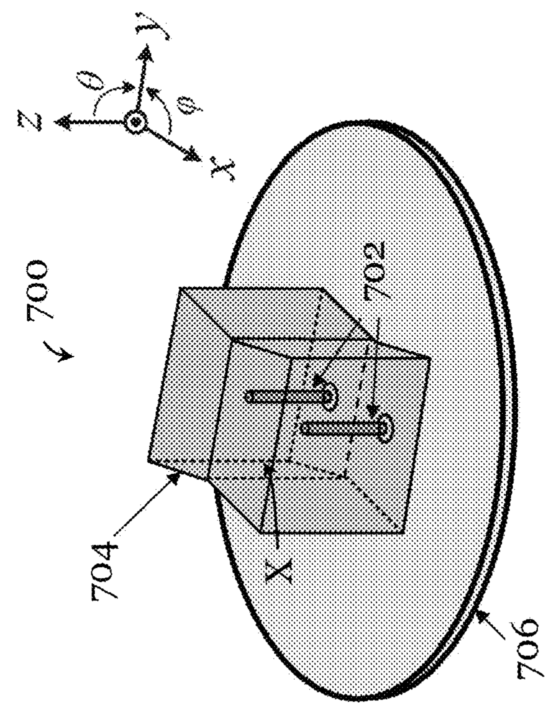
FIG. 7A is a schematic diagram (perspective view) of a dual-port antenna in one embodiment of the invention.
Figure 7C:
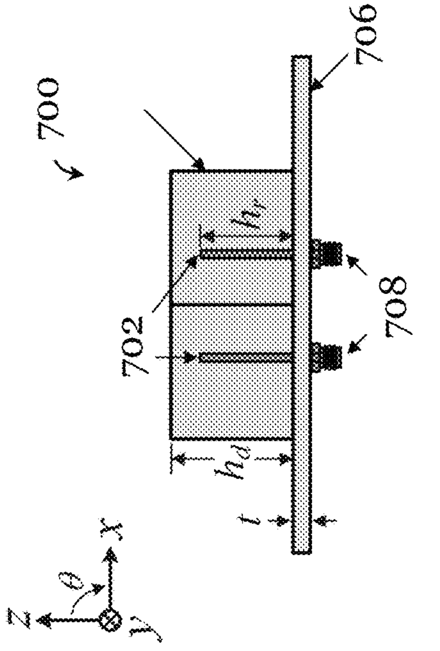
FIG. 7C is a schematic diagram (side view) of the dual-port antenna of FIG. 7A.

FIGS. 7A to 7C show a dual-port antenna 700 in one embodiment of the invention. The dual-port antenna 700 can be considered as an example implementation of the antenna 2700. The dual-port antenna 700 generally includes two antenna elements 702, a decoupler arrangement in the form of a dielectric block 704, a metallic plate 706 providing a ground plane, and two feed ports 708 (one for each of the antenna elements 702).

In this embodiment, the antenna elements 702 are each respectively operable as a monopole radiator. The two antenna elements 702 have substantially the same shape and size, both being generally cylindrical with a radius $r_r$ and a height $h_r$. The two antenna elements 702 are spaced by linear distance d. The two antenna elements 702 are also located on imaginary circle (i.e., a circular path, FIG. 7B), being angularly spaced apart by 180 degrees. The two antenna elements 702 are electrical conductors.

In this embodiment, the dielectric block 704 receives or substantially encloses the antenna elements 702, and is configured to prevent, reduce, or substantially eliminate mutual coupling of the antenna elements 702 when at least one of them operates as radiator. More specifically the dielectric block 704 provides the one or more boundaries, e.g., the one or more dielectric-air boundaries when the antenna 700 in placed in air, to scatter electromagnetic waves provided by antenna elements 702 such that: for each respective antenna element 702, when it operates as radiator, the dielectric block 704 defines a respective neutral location (i.e., field valley) that is less or substantially not susceptible to the corresponding electromagnetic waves provided by the radiator. In this embodiment, for each respective antenna element 702 the dielectric block 704 provides one such neutral location, so overall the dielectric block 704 provides two neutral locations, at which the two antenna elements 702 are placed. In this example, the dielectric block 704 has a body, with two holes formed in the body. The two holes formed in the body receive the two antenna elements 702. The two holes are arranged on an imaginary circle (i.e., a circular path) in plan view, as shown in FIG. 7B. In plan view, the center of the imaginary circle generally coincide with the center of the body, and the two holes are generally equidistant from the center of the body. In this example, the dielectric block 704 hence the body is both rotationally symmetric and reflectively symmetric. Specifically the dielectric block 704 or the body has a 180-degree rotation symmetry. Also, the dielectric block 704 or the body has a plane of symmetry X that is generally perpendicular to the plate 706. In this example, the body consists of two halves (each with one of the holes) disposed about the plane of symmetry X. The two halves are shaped as two right trapezoidal prisms, with the short side faces of the trapezoidal prisms being coincident with the plane of symmetry X. As such, in plan view, the two halves in the form of right trapezoidal prisms each respectively generally tapers to narrow towards the plane of symmetry X, such that the body is a "spindle-shaped" body has a width a, a waist width c, and a length b in plan view, and a height h d with reference to the upper surface of the plate 706. The dielectric block 704 in this example has a dielectric constant $\varepsilon_r$ of 10.

In this embodiment, the metallic plate 706 providing the ground plane is in the form of a circular plate. The dielectric block 704 is mounted on and supported by the plate 706, and is arranged generally centrally of the plate 706. The antenna elements 702 extend generally perpendicular to the plate 706. In this example, the plate 706 has a thickness t and a radius $g_r$.

In this embodiment, the two feed ports 708 are arranged on a side of the plate 706 opposite to the side with the dielectric block 704. Each of the two feed ports 708 is respectively electrically connected to a corresponding antenna element 702, to feed the corresponding antenna element 702. As the antenna 700 includes two feed ports 708, it can be referred to as a dual-port antenna.

Table II lists some of the parameter values of the dual-port antenna 700 in this example (see spindle shape, Case II). In this example, $r_r$=0.635 mm, t=2 mm, and $g_r$=40 mm.

TABLE II

Dimensions of dual-Hertzian-dipole models and corresponding dual-port antennas with different-shaped dielectric decouplers (unit: mm)

| | | Dual-Hertzian-dipole model | | | | Dual-port antenna | |
|---|---|---|---|---|---|---|---|
| Shape | Case | a | b | c | h | $h_d$ | $h_r$ |
| Diamond | Case I (d = 8 mm) | 26.6 | 30.3 | — | 37 | 18.5 | 11 |
| | Case II (d = 12 mm) | 23.5 | 38 | — | 30 | 15 | 12.5 |
| | Case III (d = 16 mm) | 22.5 | 51 | — | 22 | 11 | 11 |
| Spindle | Case I (d = 8 mm) | 18.5 | 22 | 14.9 | 34 | 17 | 10.2 |
| | Case II (d = 12 mm) | 19.5 | 25.6 | 13 | 32 | 16 | 11.4 |
| | Case III (d = 16 mm) | 20.5 | 30 | 11 | 30 | 15 | 11.4 |

In the above description of the decoupling method with reference to FIGS. 2-6, a dual-port antenna with a rectangular dielectric decoupler is presented as an example. However, the rectangular shape may not be the most suitable shape for a dual-port antenna, depending on applications. Thus, the following provides further details on the decoupler shape.

Figure 8:
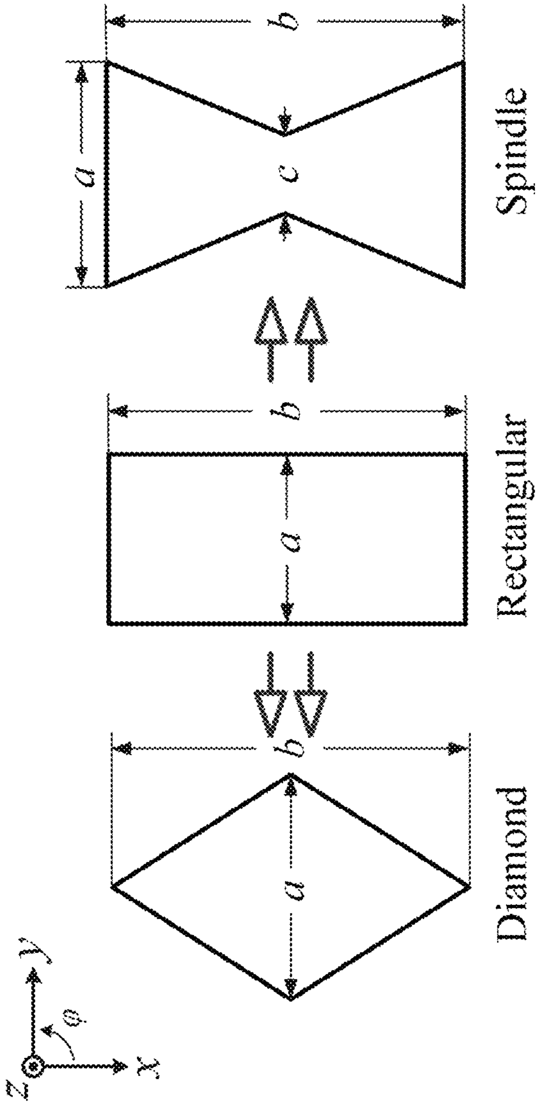
FIG. 8 is a schematic diagram illustrating optimization of dielectric-air boundary shape for a dual-port antenna.

In this example, in addition to the basic rectangular shape, two deformed shapes (diamond and spindle shapes) are also explored to optimize antenna performance. Note that the shape here refers to the shape in plan view. FIG. 8 shows their configurations and the associated optimization of dielectric-air boundary shapes. Table II lists the optimized parameter values for these configurations in this example.

Figure 9A:
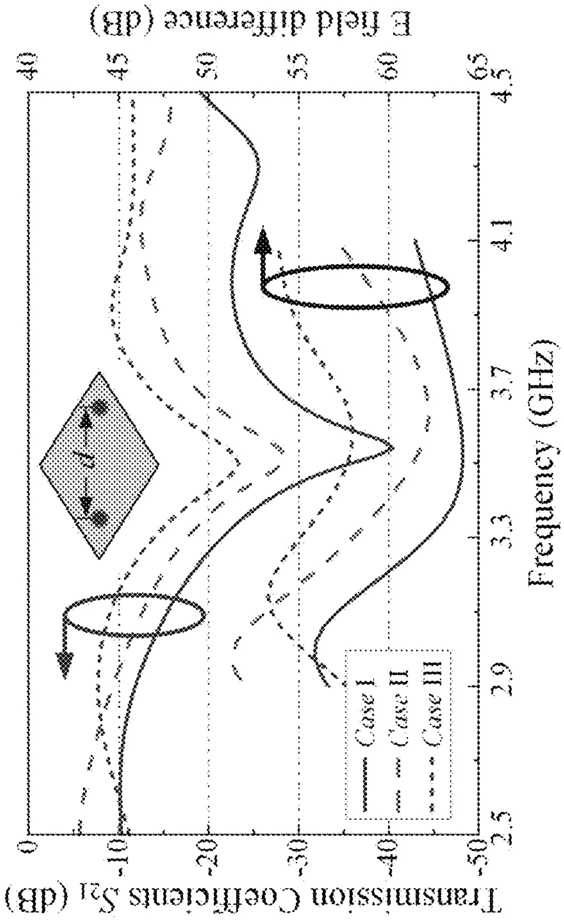
FIG. 9A is a graph showing transmission coefficients $S_{21}$ and electric field differences of a dual-port antenna with a diamond-shaped dielectric decoupler at different frequencies, for three different separation distances d between the two radiators of the dual-port antenna (Case I: d=8 mm, Case II: d=12 mm, Case III: d=16 mm)
Figure 9B:
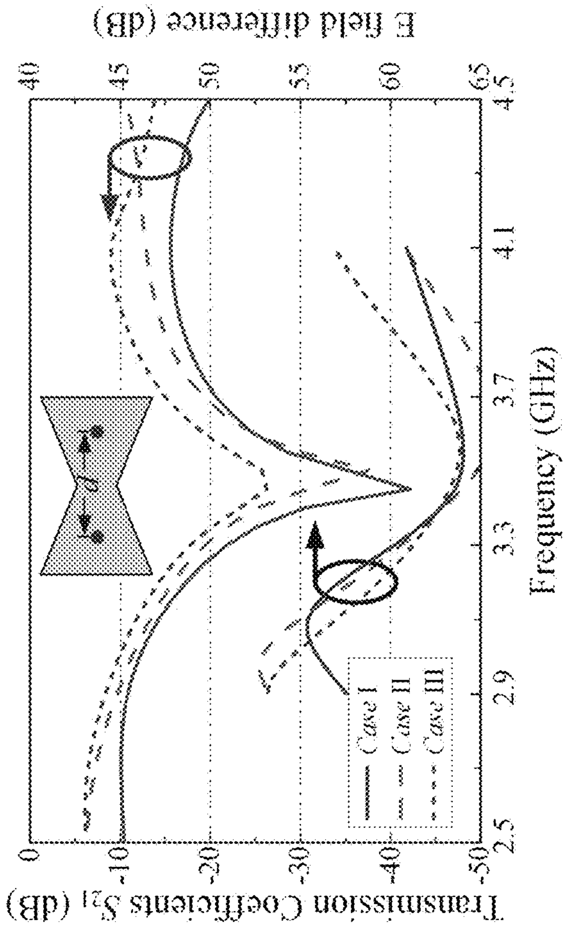
FIG. 9B is a graph showing transmission coefficients $S_{21}$ and electric field differences of a dual-port antenna with a spindle-shaped dielectric decoupler at different frequencies, for three different separation distances d between the two radiators of the dual-port antenna (Case I: d=8 mm, Case II: d=12 mm, Case III: d=16 mm)

FIGS. 9A and 9B show the mutual couplings $S_{21}$ of the dual-port antennas as well as the electric field differences of the corresponding Hertzian-dipole models, for the three cases using the diamond-shaped dielectric decouplers (FIG. 9A) and spindle-shaped dielectric decouplers (FIG. 9B) respectively. With reference to FIG. 9A, all three cases using diamond-shaped dielectric decouplers are optimized to obtain good isolations (more than 23 dB) at 3.5 GHz. With reference to FIG. 9B, dips (more than 26 dB) are observed at around 3.5 GHz of the $S_{21}$ curves for all three cases using spindle-shaped decouplers. Note that the electric field difference curves of the corresponding Hertzian-dipole models also show similar trends to mutual couplings $S_{21}$. This proves that optimizing the shape of the dielectric decoupler may improve the performance of the corresponding decoupled antenna.

Figure 10:
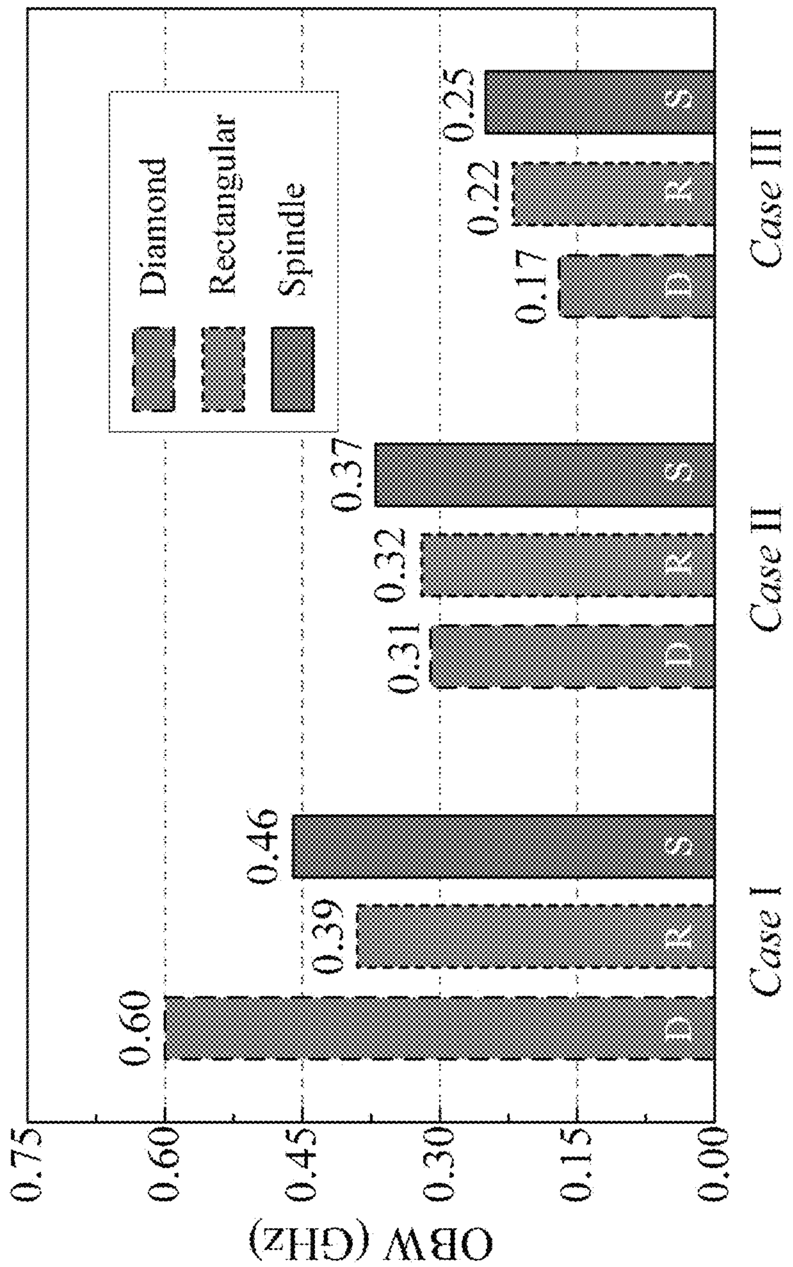
FIG. 10 is a graph showing overlapping bandwidth (OBW) of three dual-port antennas with dielectric decouplers of different shapes (diamond-shaped dielectric decoupler, rectangular-shaped dielectric decoupler, spindle-shaped dielectric coupler), for three different separation distances d between the two radiators of the dual-port antenna (Case I: d=8 mm, Case II: d=12 mm, Case III: d=16 mm)

FIG. 10 compares the overlapping bandwidths (OBWs) of the dual-port antennas using different shaped decouplers (in plan view: rectangular, diamond, and spindle). Here the OBW is defined as the overlapping part of the 10 dB impedance bandwidth and 20-dB isolation bandwidth. With reference to FIG. 10, a suitable decoupler can be selected for each of the cases to obtain a wider bandwidth.

Figure 11:
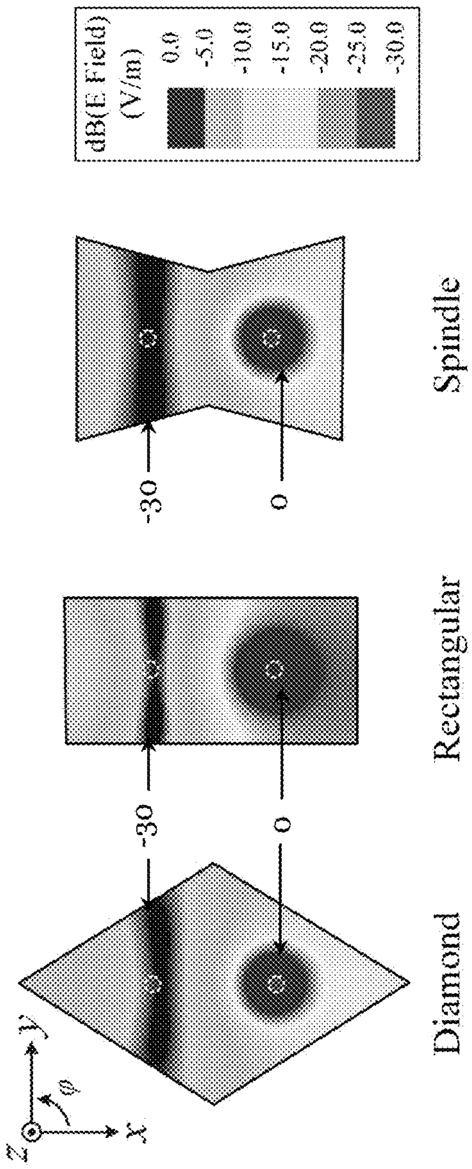
FIG. 11 is a plot illustrating normalized total complex electric field distributions (in xy plane) of dielectric decouplers of different dielectric-air boundary shapes (diamond-shaped dielectric decoupler, rectangular-shaped dielectric decoupler, spindle-shaped dielectric coupler), when separation distance d between the two radiators is 12 mm (Case II)

Take Case II (d=12 mm) as an example. FIG. 11 shows normalized total electric field distributions for different decoupler shapes (in plan view: rectangular, diamond, and spindle) in dual-Hertzian-dipole models (when d=12 mm (Case II)). It can be seen from FIG. 11 that all three shapes can generate a couple of symmetrical field valleys.

With reference to FIG. 10, the spindle-shaped decoupler can obtain the widest OBW of 0.37 GHz in one example. Therefore, the spindle-shaped decoupler is selected for the dual-port decoupled antenna in that example.

Figure 12:
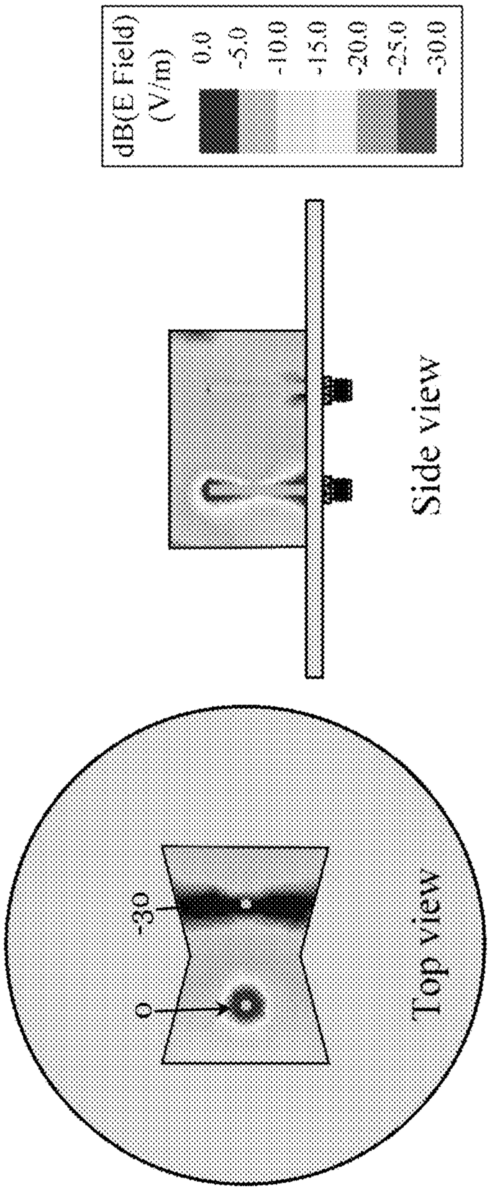
FIG. 12 is a plot illustrating normalized electric field distributions for a dual-port antenna with the spindle-shaped dielectric decoupler.

To explain the good isolation between the two ports, FIG. 12 presents top and side views of the normalized total electric field distributions in the spindle-shaped dielectric decoupler. As illustrated, the field valley near the right port can be observed when the left port is excited. This indicates that almost no electric energy is coupled to the right port when the left port is excited. Good isolation can be obtained between the two ports.

Figure 13B:
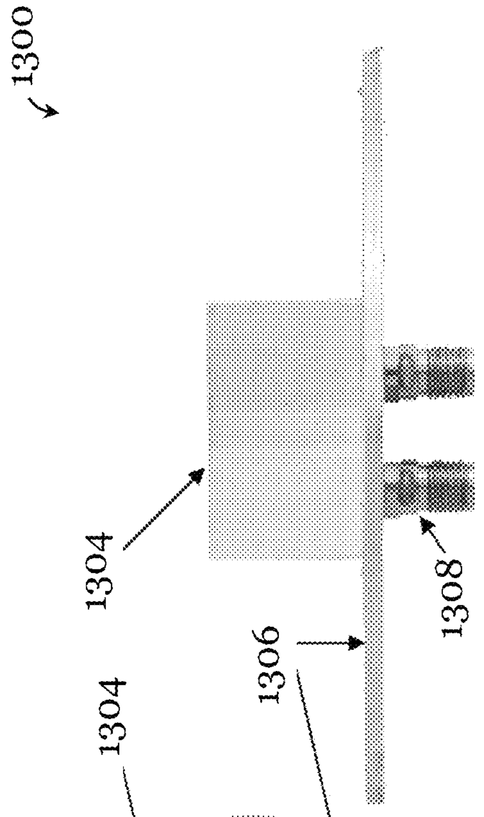
FIG. 13B is another photograph of the dual-port antenna of FIG. 13A.
Figure 13A:
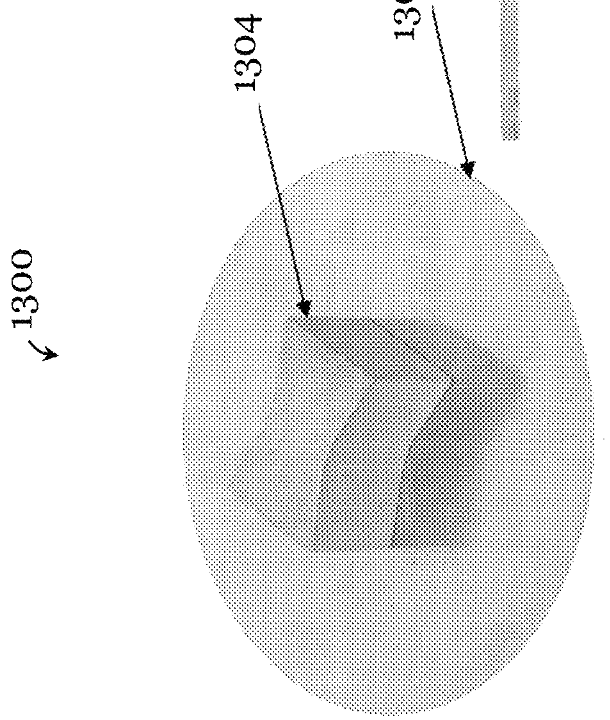
FIG. 13A is a photograph of a dual-port antenna made based on the design of the dual-port antenna of FIG. 7A.

A prototype of the optimized dual-port antenna with a spindle-shaped decoupler is fabricated in accordance with the design of FIG. 7A. The parameter values of the prototype dual-port antenna 1300 in this example are listed in Table II (see spindle shape, Case II). FIGS. 13A and 13B show the photographs of the prototype dual-port antenna 1300. The design of the prototype dual-port antenna 1300 is generally the same as that of the dual-port antenna 700 of FIG. 7A. Briefly, the prototype dual-port antenna 1300 also includes two antenna elements (hidden from view in FIGS. 13A and 13B), a decoupler arrangement in the form of a dielectric block 1304, a metallic plate 1306 providing a ground plane, and two feed ports 1308 (one for each of the antenna elements). For brevity details of these components are not repeated. In this example, the spindle-shaped dielectric block 1304 is additively manufactured, e.g., 3D printed using 3D printing filaments that have a dielectric constant of 10±0.35, and a loss tangent of 0.0030, both at 2.4 GHz. In this example, the plate 1306 providing the ground plane is made of aluminum and it has a thickness t=2 mm. In this example, the two feed ports 1308 are provided by two SMA connectors. The inner conductors of the SMA connectors are inserted through the plate 1306 and into the holes formed in the body of the dielectric block 1304, to provide the antenna elements operable as monopole radiators.

Experiments are performed on the prototype dual-port antenna to obtain measurements associated with the performance of the prototype dual-port antenna. In the experiments, The S-parameters are measured using an Agilent Vector Network Analyzer PNA-L N5230A, and the realized gains, efficiencies, and radiation patterns are measured using a Satimo StarLab system.

Figure 14:
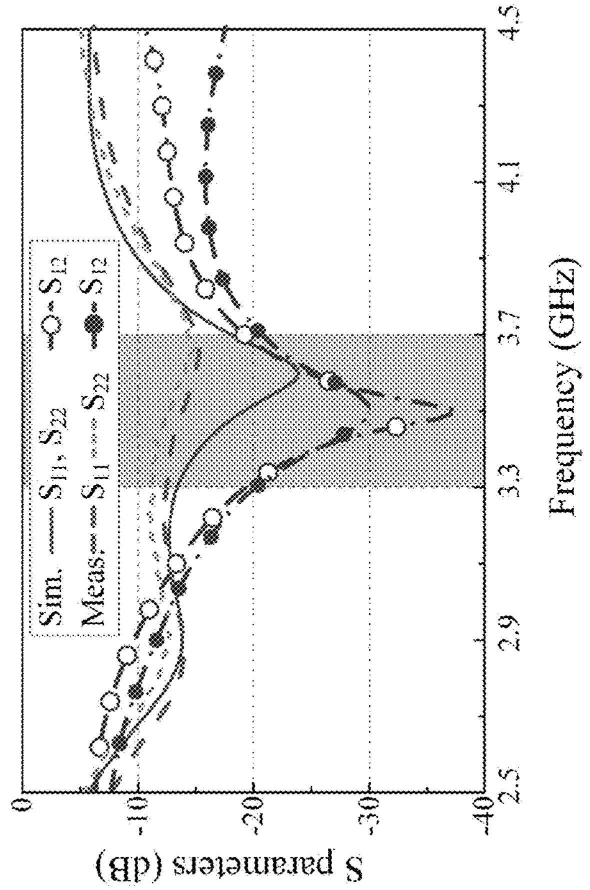
FIG. 14 is a graph showing measured and simulated S-parameters ($S_{11}$, $S_{22}$, $S_{12}$) of the dual-port antenna of FIG. 13A.

FIG. 14 shows the measured and simulated S-parameters of the dual-port antenna 1300. With reference to FIG. 14, the measured results are generally consistent with the simulated results, and the difference is mainly due to the instability/dielectric constant variations caused by the 3D printing filaments of the dielectric block. Note that there is a slight difference between the reflection coefficients of the two radiators (antenna elements) of the dual-port antenna 1300, which is mainly caused by manufacturing errors. The measured −10 dB impedance matching bandwidths of two ports can cover the 5G FR1 band of 3.3-3.7 GHz. Additionally, the measured mutual couplings $|S_{12}|$ are well below −20 dB in the 3.3-3.7 GHz band with the minimum value of −30.1 dB at 3.51 GHz.

Figure 15:
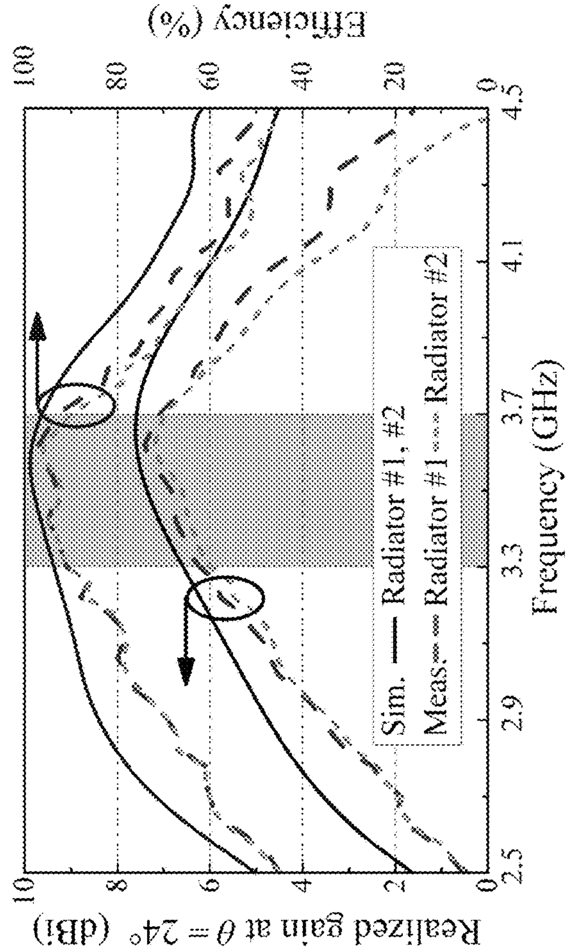
FIG. 15 is a graph showing measured and simulated realized gain at θ=24° and efficiencies associated with the two radiators #1 and #2 of the dual-port antenna of FIG. 13A.

FIG. 15 shows the measured and simulated realized gains of the dual-port antenna 1300 at θ=24° (tilting angle). The measured results have a similar trend as the simulated results, and the measured average values are around 0.5 dB lower than the simulated average values. Note that the measured maximum realized gains of radiators #1 and #2 are 7.4 dBi, and 7.2 dBi at 3.62 GHz, respectively. FIG. 15 also shows the measured and simulated antenna efficiencies. With reference to FIG. 15, the measured results are in reasonable agreement with the simulated results. The measured antenna efficiencies are more than 90% in the 3.3-3.7 GHz band, with the maximum values of radiators #1 and #2 reaching 97% and 96% at 3.62 Hz, respectively.

Figure 16A:
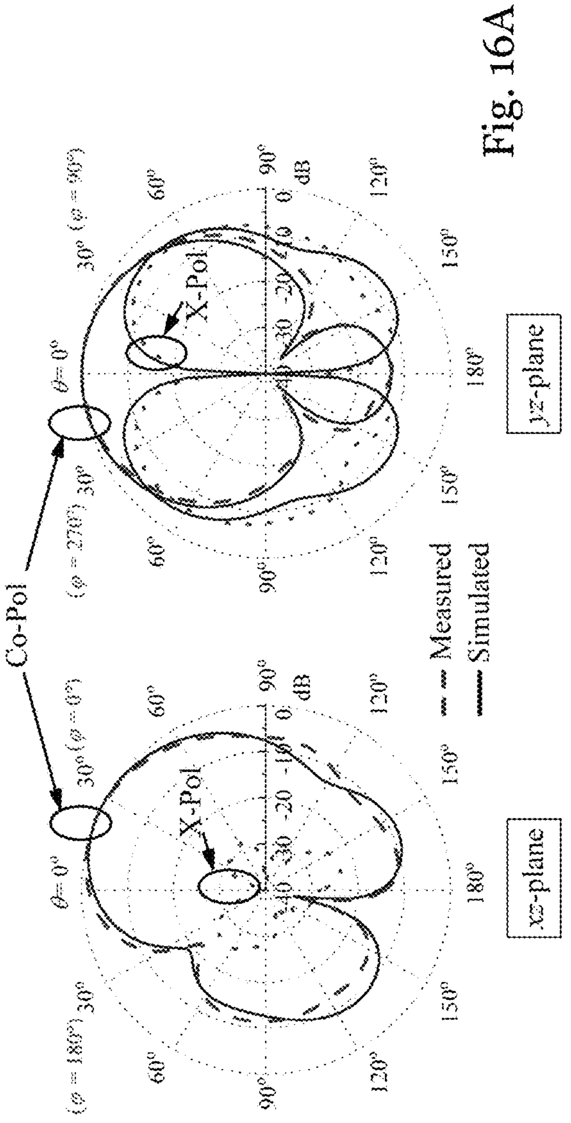
FIG. 16A is a plot showing measured and simulated radiation patterns (in xz-plane and yz-plane) at 3.5 GHz associated with radiator #1 of the dual-port antenna of FIG. 13A.
Figure 16B:
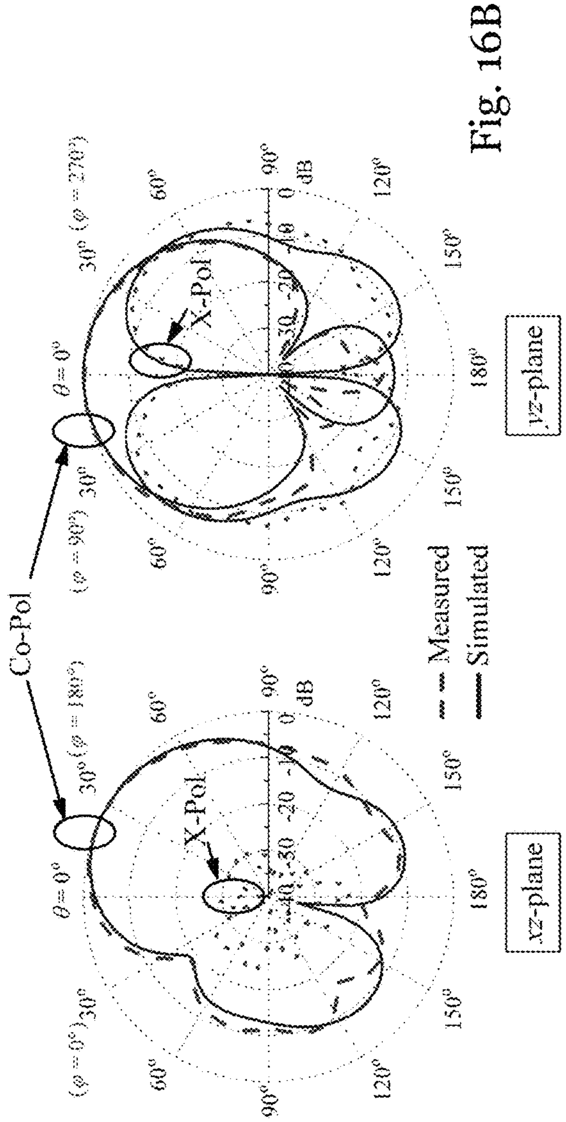
FIG. 16B is a plot showing measured and simulated radiation patterns (in xz-plane and yz-plane) at 3.5 GHz associated with radiator #2 of the dual-port antenna of FIG. 13A.

FIGS. 16A and 16B show the measured and simulated radiation patterns of radiators #1 and #2 of the dual-port antenna 1300 at 3.5 GHz. The measured patterns of both radiators are in reasonable agreement with the simulated patterns. As illustrated in FIGS. 16A and 16B, there is a tilting angle of 24° off the boresight direction in the xz-plane pattern of radiator #1. Similarly, a tilting angle of −24° off the boresight direction can also be observed in the xz-plane pattern of radiator #2. This is mainly because the radiators are offset from the decoupler center in this cutting plane (xz-plane). Besides, the finite ground size and the offset of ground also affect the location of beam peak. In the yz planes, radiators have generally symmetric patterns.

Figure 17A:
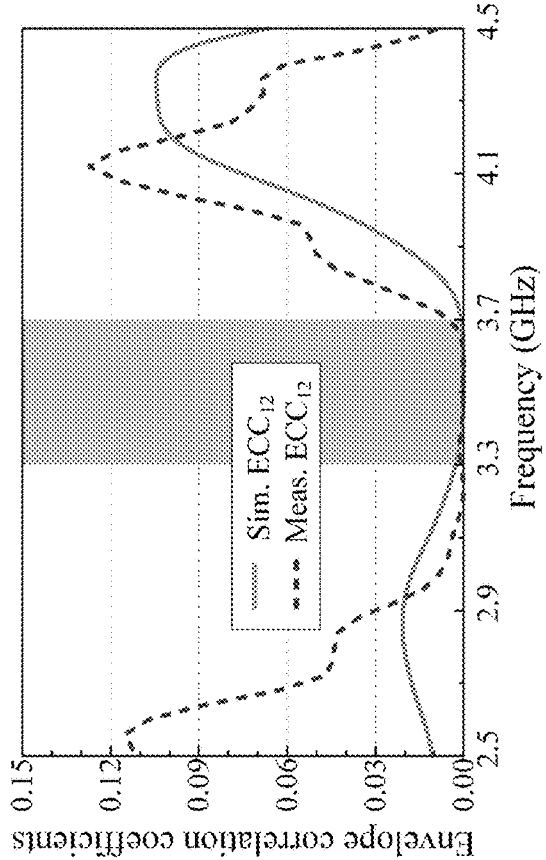
FIG. 17A is a graph showing measured and simulated envelope correlation coefficient ($ECC_{12}$) of the dual-port antenna of FIG. 13A at different frequencies.
Figure 17B:
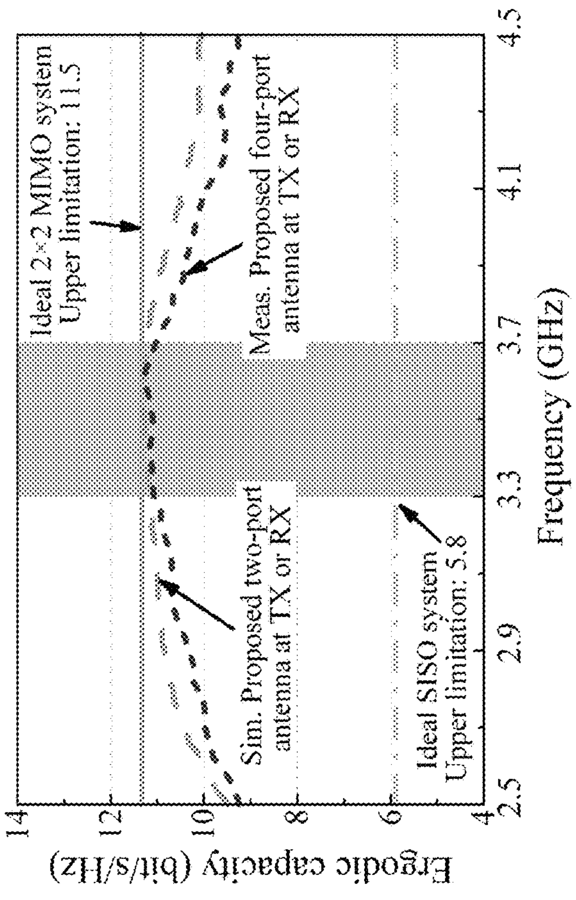
FIG. 17B is a graph showing measured and simulated ergodic capacity of the dual-port antenna of FIG. 13A as well as the theoretical ergodic capacity of an ideal 2×2 MIMO system and an ideal single-input single-output (SISO) system, at different frequencies.

FIGS. 17A and 17B present the MIMO performance of the dual-port antenna 1300. The MIMO performance includes the simulated/measured envelope correlation coefficients (ECC) in FIG. 17A and the channel capacities (CC) in FIG. 17B.

As shown in FIG. 17A, the measured results, calculated based on the measured 3D radiation patterns of radiators #1 and #2, are in good agreement with the simulate results. In the 3.3-3.7 GHz band, the measured ECC values are less than 0.01. This indicates that the dual-port antenna 1300 can generate two generally uncorrelated radiation patterns, which are desirable in MIMO applications.

FIG. 17B shows the calculated ergodic channel capacity of a 2×2 MIMO system in an isotropic scattering environment with a signal-to-noise ratio (SNR) of 20 dB. The simulated results are calculated based on the simulated ECCs and antenna efficiencies, while the measured results are based on the measured ECCs and antenna efficiencies. Reasonable agreement between the measurements and simulations can be observed. For reference, FIG. 17B also shows the theoretical capacities of the ideal 2×2 MIMO systems and the ideal SISO system. The results show that the dual-port antenna 1300 can provide an ergodic channel capacity (CC) of more than ii bit/s/Hz in the 3.3-3.7 GHz band with a maximum value of 11.25 bit/s/Hz at 3.62 GHz.

Table III shows some characteristics of the dual-port antenna 1300, which is suitable for use in MIMO systems. In the dual-port antenna 1300, the dielectric block has a relatively high dielectric constant $\varepsilon_r$=10, which helps to reduce the footprint and profile, to enable a relatively compact antenna design. In the dual-port antenna 1300, Monopole antennas are employed due to their inherent advantages such as a smaller occupied area and wider bandwidth. Once a dielectric block with a high dielectric constant is employed, although the profile can be further reduced, the bandwidth may inevitably be sacrificed. Thus there may still exists a trade-off between antenna size and performance. The dual-port antenna 1300 is a compact dual-port antenna with an OBW of 12.6%, a high measured average efficiency (93.5%) and a low ECCs (<0.01) (which results in a high ergodic CC (>11 bit/s/Hz)).

and are angularly spaced by 90°. The four antenna elements 1802 are electrical conductors.

In this embodiment, the dielectric block 1804 receives or substantially encloses the antenna elements 1802, and is configured to prevent, reduce, or substantially eliminate mutual coupling of the antenna elements 1802 when at least one of them operates as radiator. More specifically the dielectric block 1804 provides the one or more boundaries, e.g., the one or more dielectric-air boundaries when the antenna 1800 in placed in air, to scatter electromagnetic waves provided by antenna elements 1802 such that: for each respective antenna element 1802, when it operates as radiator, the dielectric block 1804 defines respective neutral locations (i.e., field valleys) that are less or substantially not susceptible to the corresponding electromagnetic waves provided by the radiator. In this embodiment, overall the dielectric block 1804 provides four such neutral locations, at which the four antenna elements 1802 are placed. In this example, the dielectric block 1804 has a body, with four holes and a central through-hole 1810 formed in the body.

The four holes formed in the body receive the four antenna elements 1802. The four holes are arranged on an imaginary circle (i.e., a circular path) in plan view, as shown in FIG. 18B. In plan view, the center of the imaginary circle generally coincide with the center of the body, and the four holes are generally equidistant from the center of the body. The four holes are disposed around the through-hole 1810 which is arranged generally centrally of the body. The through-hole 1810 is shaped as a void of a right squared prism, with a side length $l_{in}$ in plan view. The through-hole 1810 does not receive any of the antenna elements 1802. The

TABLE III

Some characteristics of the dual-port antenna 1300

| Tech. | Type | Pattern | BW (%) | *Footprint ($\lambda^2$) | Profile ($\lambda$) | Eff. (%) | CC (bit/s/Hz) |
|---|---|---|---|---|---|---|---|
| Weak field distribution | Monopole | Quasi-boresight | 12.6 | 0.30 × 0.23 | 0.19 | 93.5 | >11 |

BW: the overlapping part of the −10 dB impedance matching bandwidth and −20 dB isolation bandwidth
λ: the wavelength of center frequency in the free space
*Note that the size of ground plane with feeding circuit is not included in the footprint From the above example, it can be seen that the proposed dielectric decoupler can be useful in dual-port antenna. However, the invention is not limited to a dual-port system, and instead can be applied in an N-port system (N≥2). Thus, following from the above, a quad-port decoupling example is now provided. A quad-port decoupled antenna for MIMO applications is presented, optimized, fabricated, and measured. Its MIMO performance is also discussed.

Figure 18A:
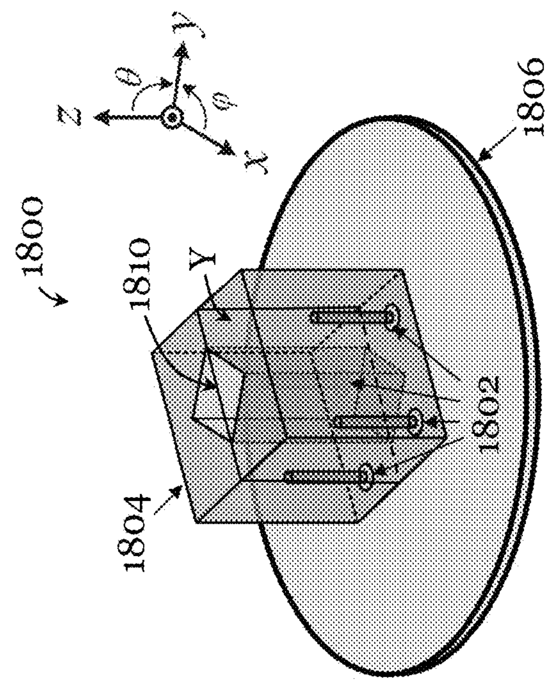
FIG. 18A is a schematic diagram (perspective view) of a quad-port antenna in one embodiment of the invention.
Figure 18B:
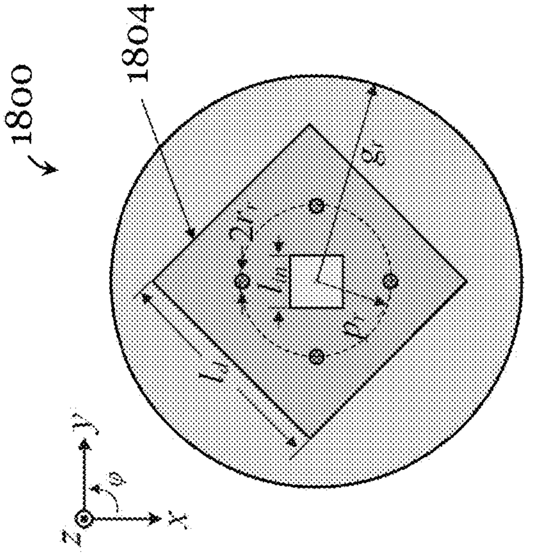
FIG. 18B is a schematic diagram (plan view) of the quad-port antenna of FIG. 18A.
Figure 18C:
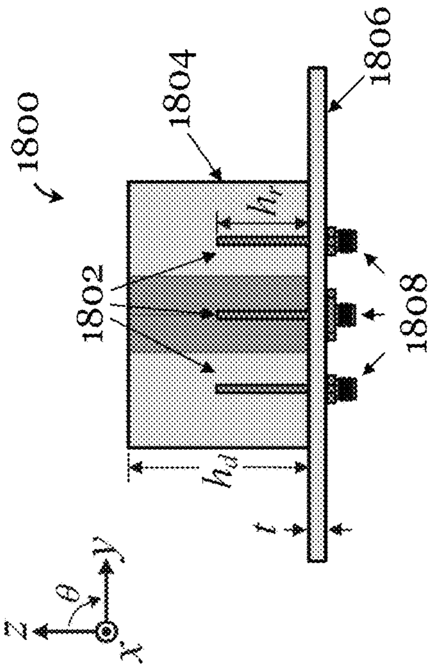
FIG. 18C is a schematic diagram (side view) of the quad-port antenna of FIG. 18A.

FIGS. 18A to 18C show a quad-port antenna 1800 in one embodiment of the invention. The quad-port antenna 1800 can be considered as an example implementation of the antenna 2700. The quad-port antenna 1800 generally includes four antenna elements 1802, a decoupler arrangement in the form of a dielectric block 1804, a metallic plate 1806 providing a ground plane, and four feed ports 1808 (one for each of the antenna elements 1802).

In this embodiment, the antenna elements 1802 are each respectively operable as a monopole radiator. The four antenna elements 1802 have substantially the same shape and size, both being generally cylindrical with a radius $r_r$ and a height $h_r$. The four antenna elements 1802 are spaced by distance d. The four antenna elements 1802 are also located on an imaginary circle (i.e., a circular path) with a radius $p_r$ through-hole 1810 is arranged to provide further boundaries (e.g., dielectric-air boundaries) for facilitating defining the neutral locations. In this example, the dielectric block 1804 hence the body is both rotationally symmetric and reflectively symmetric. Specifically the dielectric block 1804 or the body has a 90-degree rotation symmetry. Also, the dielectric block 1804 or the body has a plane of symmetry Y that is generally perpendicular to the plate 1806. In this example, the body consists of two halves (each with one of the holes) disposed about the plane of symmetry Y. The two halves are shaped as two right rectangular prisms each including two of the holes and half of the through-hole 1810 (each half of the through-hole 1810 is shaped as a right triangular prism void). The resulting body are shaped as a right squared prism, or a "rectangular-shaped" body, with a side length $l_d$ in plan view and a height h d with reference to the upper surface of the plate 1806. The dielectric block 1804 in this example has a dielectric constant $\varepsilon_r$ of 10. Referring to FIG. 18B, in this example, in plan view, the body has two face diagonals, with two of the four antenna elements disposed on one face diagonal and another two of the four antenna elements disposed on another face diagonal. On the other hand, in plan view, the through-hole 1810 has two face diagonals each arranged at an acute angle of about 45 degrees to the two face diagonals of the body.

In this embodiment, the metallic plate 1806 providing the ground plane is in the form of a circular plate. The dielectric block 1804 is mounted on and supported by the plate 1806, and is arranged generally centrally of the plate 1806. The antenna elements 1802 extend generally perpendicular to the plate 1806. In this example, the plate 1806 has a thickness t and a radius $g_r$.

In this embodiment, the four feed ports 1808 are arranged on a side of the plate 1806 opposite to the side with the dielectric block 1804. Each of the four feed ports 1808 is respectively electrically connected to a corresponding antenna element 1802, to feed the corresponding antenna element 1802. As the antenna 1800 includes four feed ports 1808, it can be referred to as a quad-port antenna.

In this example, the parameter values are as follows: $\varepsilon_r$=10, $h_d$=33.7 mm, $h_r$=10.4 mm, t=2 mm, $r_r$=1 mm, $l_d$=33.7 mm, $l_{in}$=13.3 mm, $p_r$=11 mm, and $g_r$=45 mm.

Figure 19:
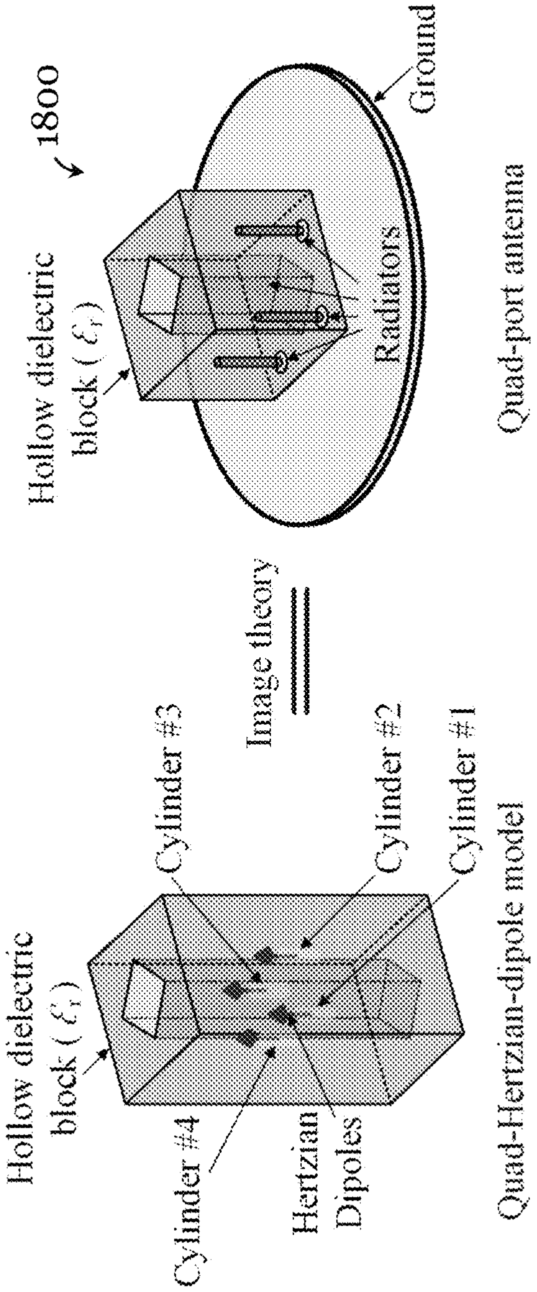
FIG. 19 is a schematic diagram illustrating a quad-Hertzian-dipole model and a corresponding quad-port antenna.

Based on the decoupling operation of the decoupler, a dielectric block with three rotationally symmetric field valleys should be found when one port (antenna element 1802) is excited. FIG. 19 shows a quad-Hertzian-dipole model and a corresponding quad-port antenna (same as the quad-port antenna 1800,), to show the conversion from the dual-Hertzian-dipole model to the quad-port antenna 1800. As shown in FIG. 19, a hollow rectangular dielectric decoupler (dielectric block with central through-opening) is employed in this example. In this example, the parameter values are the same as those of the quad-port antenna 1800, except that the height of the dielectric block in the quad-Hertzian-dipole model is twice that of the quad-port antenna. The quad-Hertzian-dipole model in this example has four rotationally symmetrical (rotation of 90°) cylindrical regions or cylinders #1, #2, #3, and #4.

Figure 20:
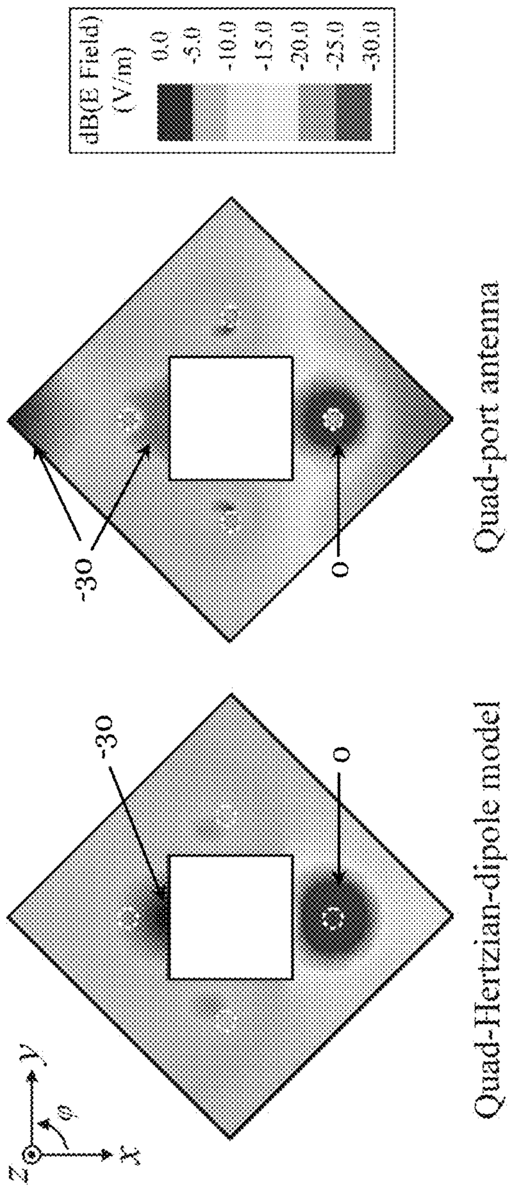
FIG. 20 is a plot illustrating normalized total complex electric field distributions (in xy plane) for the quad-Hertzian-dipole model and the quad-port antenna of FIG. 19.

FIG. 20 shows the normalized total electric field distributions for the Hertzian-dipole model of FIG. 19 in xy-plane. As shown in FIG. 20, for the Hertzian-dipole model, three field valleys near cylinders #2, #3, and #4 can be observed when a Hertzian dipole in cylinder #1 is excited. FIG. 20 also shows the electric field distribution when radiator #1 of the quad-port antenna 1800 is excited. It can be seen that when radiator #1 of the quad-port antenna 1800 is excited, three field valleys can be observed around radiators #2, #3, and #4 of the quad-port antenna 1800.

Figure 21:
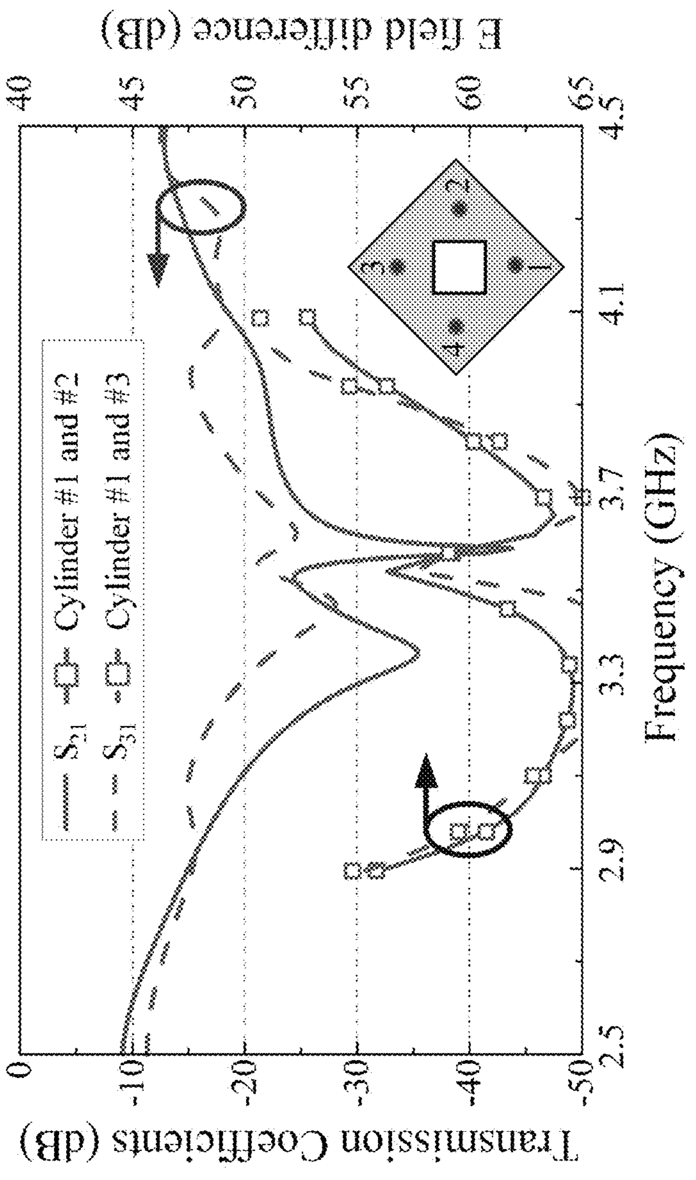
FIG. 21 is a graph showing transmission coefficients of the quad-port antenna of FIG. 19 and the electric field differences of quad-Hertzian-dipole model of FIG. 19.

FIG. 21 shows the mutual couplings of the quad-port antenna 1800 and the complex electric field differences of the Hertzian-dipole model of FIG. 19. With reference to FIG. 21, good isolations (more than 21.5 dB) can be obtained among all ports in the 3.3-3.7 GHz band using the hollow rectangular dielectric decoupler. The trends of mutual couplings are consistent with the corresponding electric field difference results. This shows that a quad-port antenna system can be effectively decoupled by loading a suitable decoupler in accordance with embodiments of the invention.

Figure 22B:
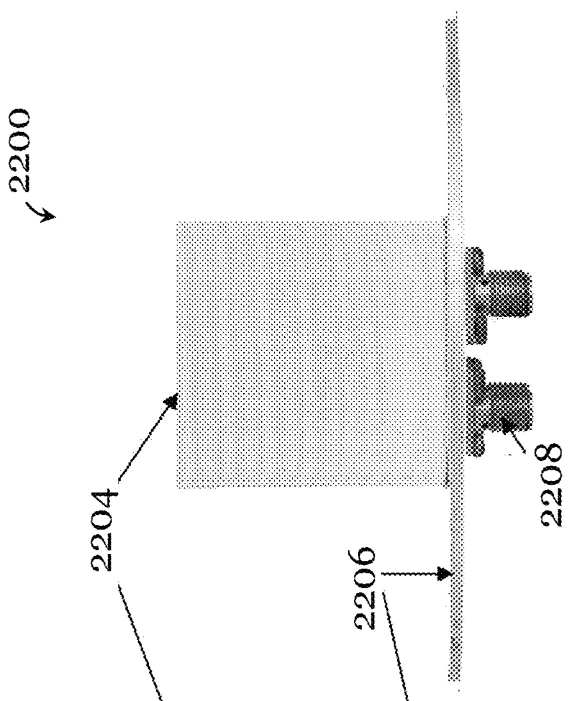
FIG. 22B is another photograph of the quad-port antenna of FIG. 22A.
Figure 22A:
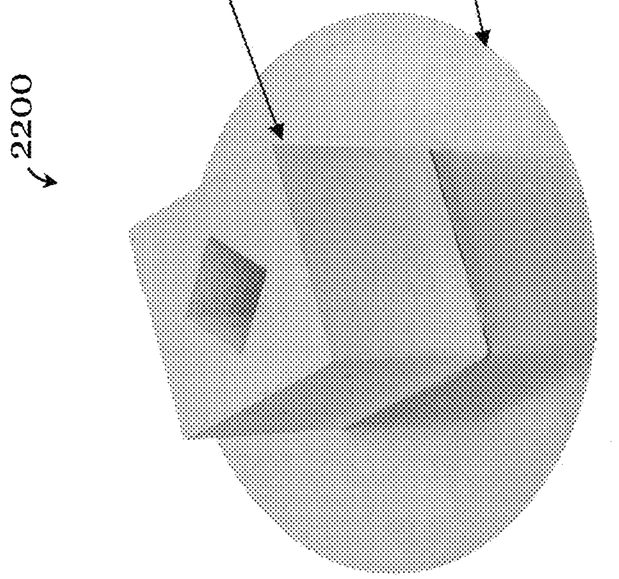
FIG. 22A is a photograph of a quad-port antenna made based on the design of the quad-port antenna of FIG. 18A.

A prototype of the optimized quad-port antenna is fabricated in accordance with the design of FIG. 18A. FIGS. 22A and 22B show the photographs of the prototype quad-port antenna 2200. The design of the prototype quad-port antenna 2200 is generally the same as that of the quad-port antenna 1800 of FIG. 18A. Briefly, the prototype quad-port antenna 2200 also includes four antenna elements (hidden from view in FIGS. 22A and 22B), a decoupler arrangement in the form of a dielectric block 2204, a metallic plate 2206 providing a ground plane, and four feed ports 2208 (one for each of the antenna elements). For brevity details of these components are not repeated. In this example, the dielectric block 2204 is additively manufactured, e.g., 3D printed using 3D printing filaments. In this example, the plate 2206 providing the ground plane is made of aluminum. In this example, the four feed ports 2208 are provided by four SMA connectors. The inner conductors of the SMA connectors are inserted through the plate 2206 and into the holes formed in the body of the dielectric block 2204, to provide the antenna elements operable as monopole radiators.

Figure 23A:
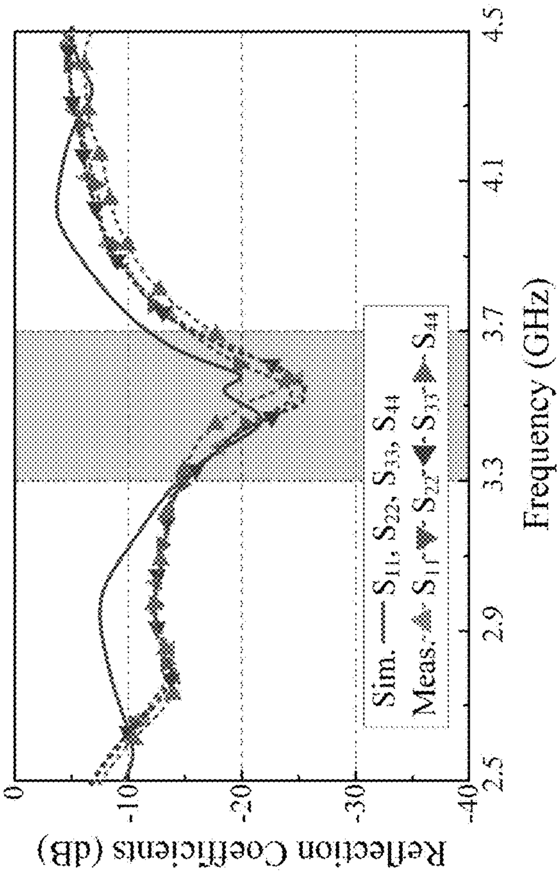
FIG. 23A is a graph showing measured and simulated reflection coefficients ($S_{11}$, $S_{22}$, $S_{33}$, $S_{44}$) of the quad-port antenna of FIG. 22A.
Figure 23B:
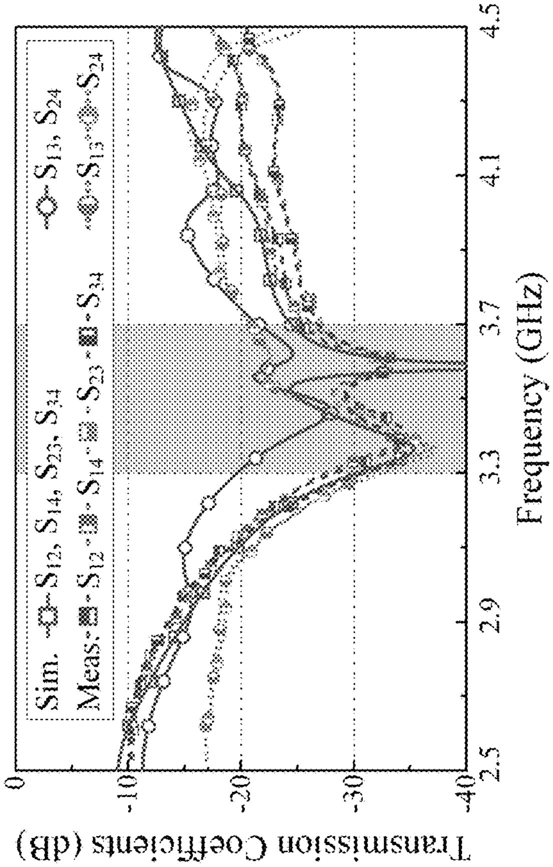
FIG. 23B is a graph showing measured and simulated transmission coefficients coefficients ($S_{12}$, $S_{14}$, $S_{23}$, $S_{34}$, $S_{13}$, $S_{24}$) of the quad-port antenna of FIG. 22A.
Figure 24A:
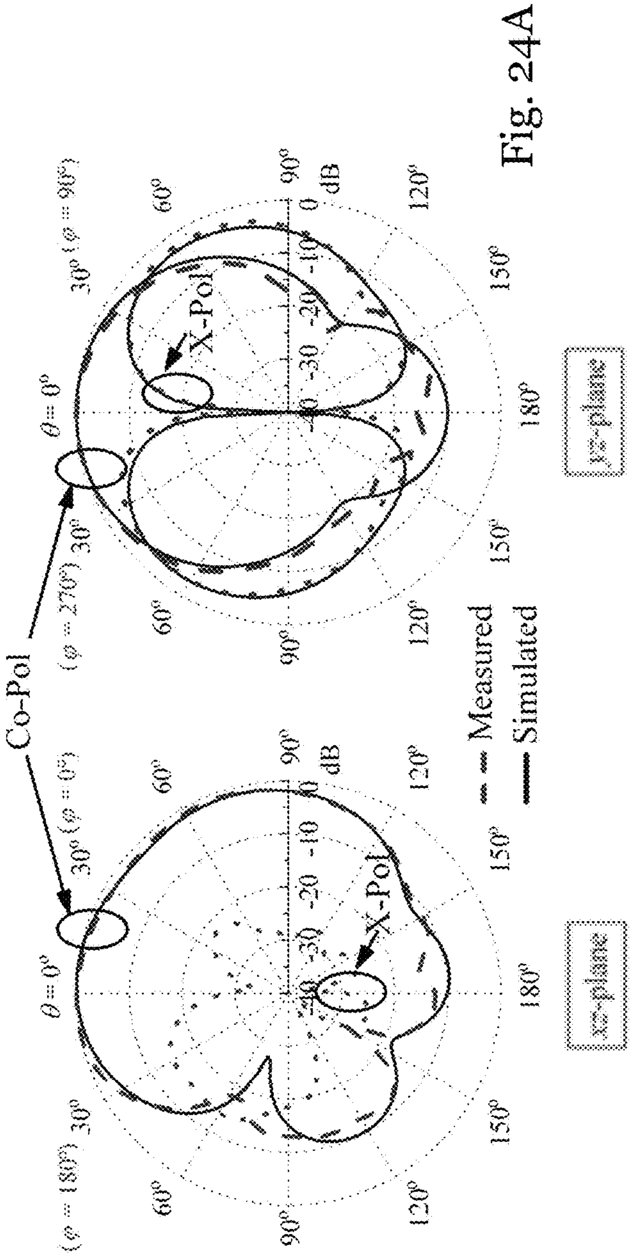
FIG. 24A is a plot showing measured and simulated radiation patterns (in xz-plane and yz-plane) at 3.5 GHz associated with radiator #1 of the quad-port antenna of FIG. 22A.
Figure 24B:
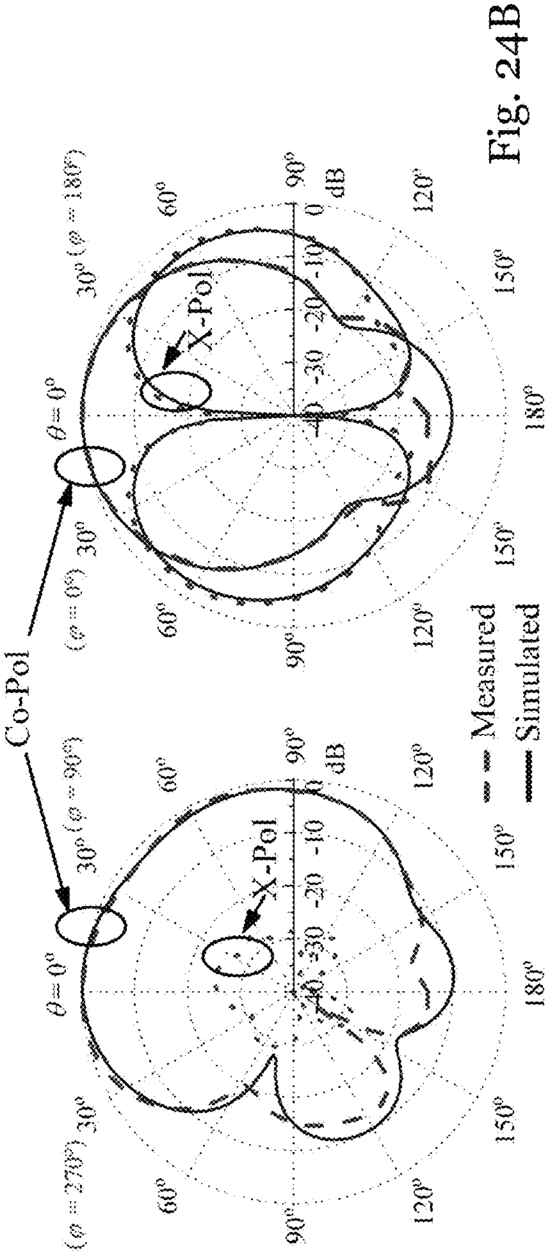
FIG. 24B is a plot showing measured and simulated radiation patterns (in xz-plane and yz-plane) at 3.5 GHz associated with radiator #2 of the quad-port antenna of FIG. 22A.
Figure 24C:
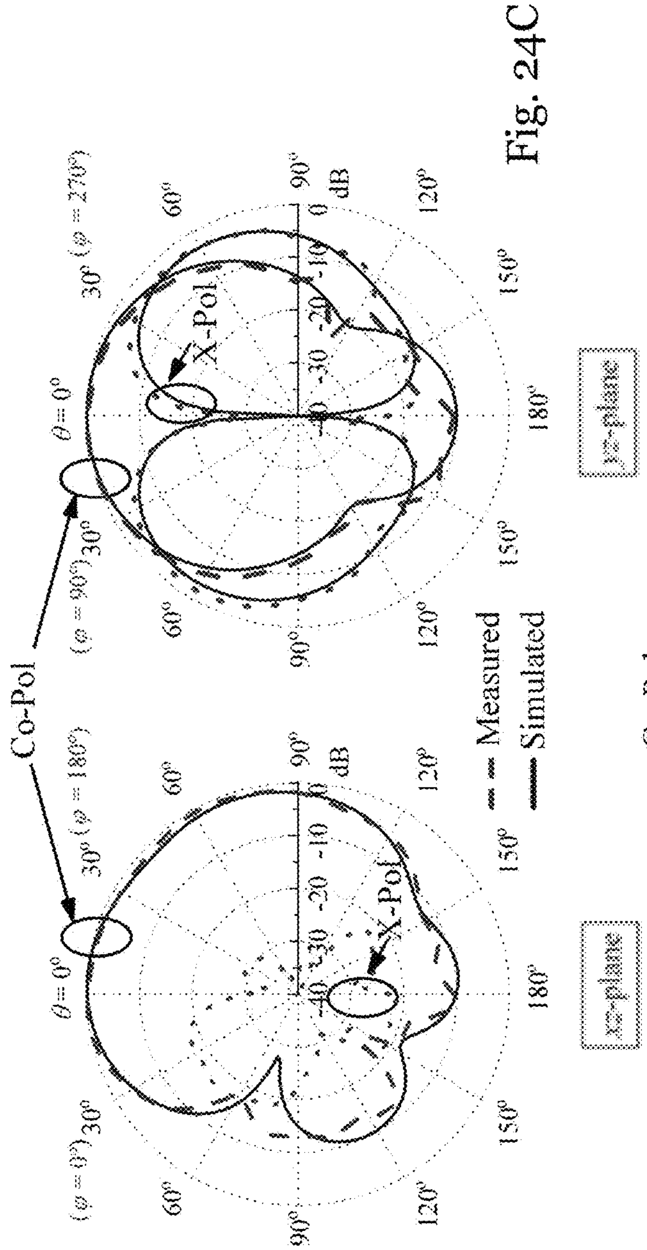
FIG. 24C is a plot showing measured and simulated radiation patterns (in xz-plane and yz-plane) at 3.5 GHz associated with radiator #3 of the quad-port antenna of FIG. 22A.
Figure 24D:
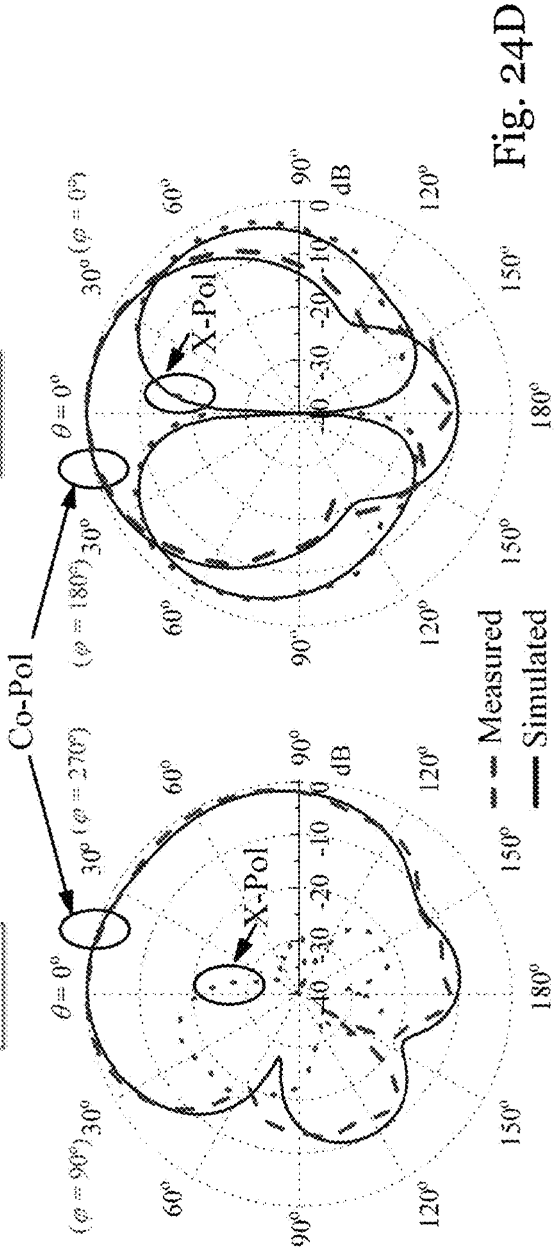
FIG. 24D is a plot showing measured and simulated radiation patterns (in xz-plane and yz-plane) at 3.5 GHz associated with radiator #4 of the quad-port antenna of FIG. 22A.

FIGS. 23A and 23B show the measured and simulated reflection coefficients and transmission coefficients of the quad-port antenna 2200. With reference to FIGS. 23A, the measured reflection coefficients of all four ports are in reasonable agreement with the simulated reflection coefficients. The difference may be due to the dielectric constant variations of the 3D printing filaments. The slight differences among the reflection coefficients of the four radiators are mainly caused by manufacturing errors. The measured 10 dB impedance bandwidths of four radiators can cover the 3.3-3.7 GHz band. As shown in FIG. 23B, all the measured mutual couplings are less than −20 dB in the 3.3-3.7 GHz band. Note that the measured minimum value of $S_{12}$ and $S_{13}$ are −35 dB at 3.41 GHz and −37 dB at 3.35 GHz, respectively.

FIGS. 24A to 24D show the measured and simulated radiation patterns at 3.5 GHz for each of the four radiators of the quad-port antenna 2200. As shown in these Figures, boresight radiation patterns are observed in two vertical cutting planes. Also, the measured patterns are in reasonable agreement with the simulated patterns.

Figure 25A:
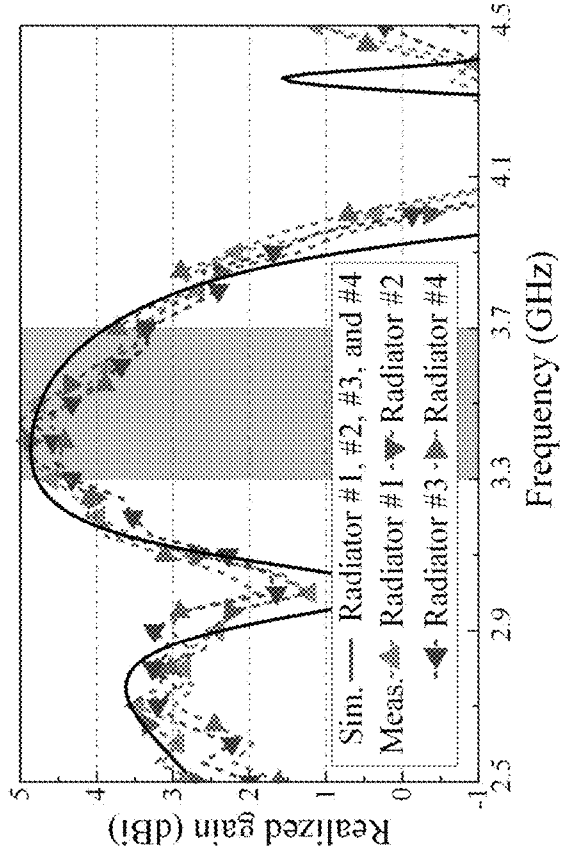
FIG. 25A is a graph showing measured and simulated realized gain associated with the four radiators #1, #2, #3, #4 of the quad-port antenna of FIG. 22A at different frequencies.

FIG. 25A shows the measured and simulated realized gains of the four radiators of the quad-port antenna 2200. The measured results show reasonable agreement with the simulated results, and their average values are about 0.4 dB lower than the simulated average values. The measured maximum realized gains of radiators #1, #2, #3, and #4 are 5.0 dBi, 5.0 dBi, 4.8 dBi, and 4.7 dBi at 3.45 GHz, respectively.

Figure 25B:
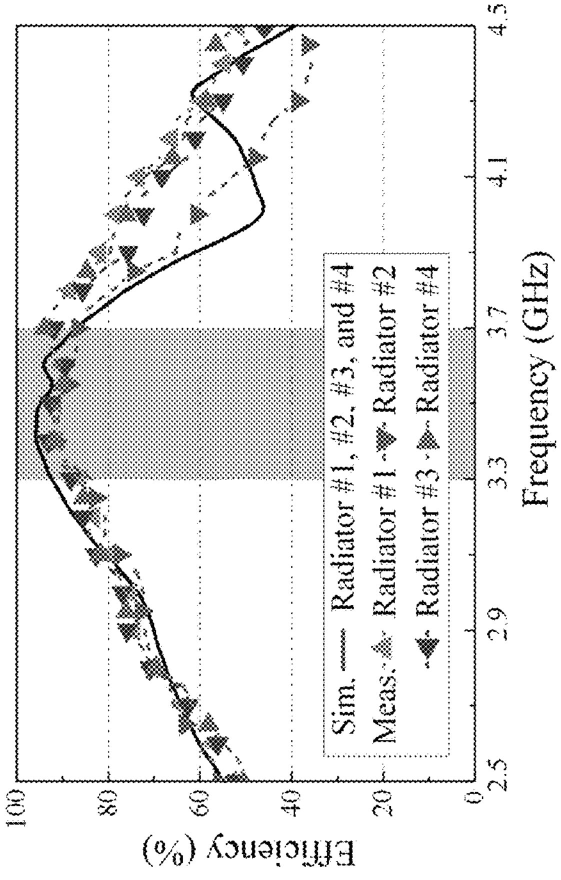
FIG. 25B is a graph showing measured and simulated antenna efficiency associated with the four radiators #1, #2, #3, #4 of the quad-port antenna of FIG. 22A at different frequencies.

FIG. 25B shows the measured and simulated antenna efficiencies of the four radiators of the quad-port antenna 2200. With reference to FIG. 25B, the measured results are in reasonable agreement with the simulated results. The measured antenna efficiencies are more than 83.9% in the 3.3-3.7 GHz band with a maximum value of around 92% at 3.45 GHz.

Figure 26A:
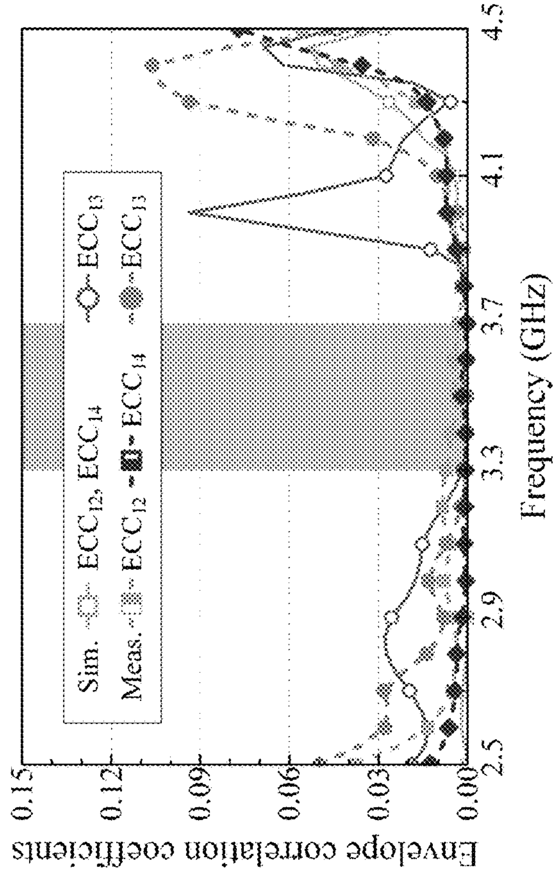
FIG. 26A is a graph showing measured and simulated envelope correlation coefficients of the quad-port antenna of FIG. 22A at different frequencies.
Figure 26B:
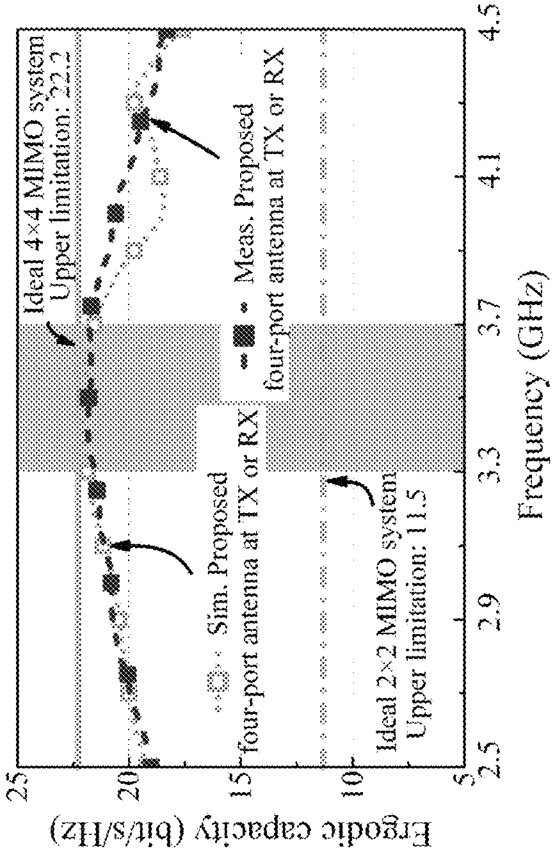
FIG. 26B is a graph showing measured and simulated ergodic capacity of the quad-port antenna of FIG. 22A as well as the theoretical ergodic capacity of an ideal 4×4 MIMO system and an ideal 2×2 MIMO system, at different frequencies.

FIGS. 26A and 26B shows the MIMO performance of the quad-port antenna 2200. The MIMO performance includes the simulated/measured envelope correlation coefficients (ECC) in FIG. 26A and the channel capacities (CC) in FIG. 26B. As illustrated in FIG. 26A, the simulated and measured envelope correlation coefficients (ECCs) correspond well. In the 3.3-3.7 GHz band, the measured ECC values are less than 0.01. This indicates that the quad-port antenna has four uncorrelated radiation patterns, which can be applied in MIMO applications. FIG. 26B shows the calculated ergodic channel capacity of a 4×4 MIMO system in an isotropic scattering environment with a signal-to-noise ratio (SNR) of 20 dB. As illustrated, there is a reasonable agreement between the measurements and simulations. For comparison, the theoretical capacities of the ideal 4×4 and 2×2 MIMO systems are also provided. The results indicate that the quad-port antenna can provide a channel capacity of more than 21.5 bit/s/Hz in the 3.3-3.7 GHz band with a maximum value of 21.85 bit/s/Hz at 3.45 GHz.

Table IV shows some characteristics of the quad-port antenna 2200, which is suitable for use in MIMO systems. The quad-port antenna 2200 is a compact quad-port decoupled antenna with the OBW of 18%. The quad-port antenna 2200 realizes a compact footprint and obtains a high ergodic CC (>21.5 bit/s/Hz).

TABLE III

| Some characteristics of the quad-port antenna 2200 | | | | | | | |
|---|---|---|---|---|---|---|---|
| Tech. | Type | Pattern | BW (%) | *Footprint ($\lambda^2$) | Profile ($\lambda$) | Eff. (%) | CC (bit/s/Hz) |
| Weak field distribution | Monopole | Boresight | 18 | 0.39 × 0.39 | 0.39 | 90.5 | >21.5 |

BW: the overlapping part of the −10 dB impedance matching bandwidth and −20 dB isolation bandwidth
A: the wavelength of center frequency in the free space
*Note that the size of ground plane with feeding circuit is not included in the footprint Embodiments of the invention have provided a dielectric decoupler for an antenna, e.g., for MIMO systems. In some embodiments, by optimizing the shape and size of the decoupler, field valleys can be generated inside the decoupler when one port (antenna element) is excited. A multi-port decoupled antenna can be realized based on the image theory. Some embodiments presented above relate to a dual-port antenna and a quad-port antenna. In these embodiments, the shape and size of the decoupler shapes can be optimized to improve decoupling performance. The decoupling method in embodiments of the invention can be applied to N-port antenna (N≥2). In some embodiments the decoupling only employs a simple dielectric block. The invention can be used to create compact decoupled antenna with multiple ports for MIMO applications.

In some cases, the antenna of the invention can be used in a device such as a communication device that can perform, at least, wireless communication. The device may be an IoT device, a satellite communication device, etc. The device may be a multiple-in multiple-out (MIMO) antenna device. The device may be a portable or handheld device.

In some cases, the antenna of the invention can be used in a multiple-in multiple-out (MIMO) antenna system.

In some cases, the antenna of the invention can be used in a communication system, such as a multiple-in multiple-out (MIMO) communication system, which may be operable to communicate using 5G communication protocol(s). As such the invention also concern a device, or a communication device, with one or more of the antenna in the embodiments of the invention.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). For example, the shape, size, form, and/or construction of the antenna, the dielectric block, the antenna elements, the feed ports, etc., may be different from those specifically illustrated. For example, the operation frequency of the antenna can be changed to other frequency, frequencies, or frequency band(s).

The invention claimed is:

1. An antenna comprising:

a plurality of antenna elements each respectively operable as a radiator of electromagnetic waves; and a decoupler arrangement operably coupled with the plurality of antenna elements and configured to prevent, reduce, or substantially eliminate mutual coupling of all of the plurality of antenna elements when at least one of the plurality of antenna elements is operated as radiator of electromagnetic waves;

wherein the decoupler arrangement comprises a dielectric decoupler arrangement, the dielectric decoupler arrangement providing one or more boundaries operable to scatter electromagnetic waves provided by the plurality of antenna elements such that: for each respective one of the plurality of antenna elements, when the antenna element operates as radiator of electromagnetic waves, the dielectric decoupler arrangement defines one or more respective neutral locations that are less or substantially not susceptible to the corresponding electromagnetic waves provided by the radiator; and wherein the plurality of antenna elements are disposed at the neutral locations; and wherein the dielectric decoupler arrangement comprises a dielectric block that: receives or substantially encloses the plurality of antenna elements, and provides the one or more boundaries; the dielectric block comprising a body and one or more holes formed in the body and receiving the plurality of antenna elements.

2. The antenna of claim 1, wherein the one or more holes comprises a plurality of holes each receiving a respective one of the plurality of antenna elements; and wherein the plurality of holes are disposed at the neutral locations.

3. The antenna of claim 2, wherein the plurality of holes are angularly spaced apart on an imaginary circle in plan view.

4. The antenna of claim 3, wherein the plurality of holes are angularly spaced apart generally evenly on the imaginary circle in plan view.

5. The antenna of claim 2, wherein the dielectric block is rotationally symmetric.

6. The antenna of claim 2, wherein the dielectric block is reflectively symmetric.

7. The antenna of claim 6, wherein the body consists of two portions or halves disposed about a plane of symmetry; and wherein at least one of the plurality of holes is formed in each respective one of the two portions or halves.

8. The antenna of claim 7, wherein the two portions or halves are shaped as right prisms.

9. The antenna of claim 8, wherein the two portions or halves are shaped as like right squared or rectangular prisms.

10. The antenna of claim 8, wherein the two portions or halves are shaped as like right trapezoidal prisms, and wherein short side faces of the right trapezoidal prisms are coincident with the plane of symmetry such that in plan view the two portions or halves each respectively generally tapers to narrow towards the plane of symmetry.

11. The antenna of claim 8, wherein the two portions or halves are shaped as like right triangular prisms, and wherein a lateral face of one right triangular prism and a lateral face of another right triangular prism are coincident with the plane of symmetry such that in plan view the two portions or halves each respectively generally tapers to narrow away from the plane of symmetry.

12. The antenna of claim 7, wherein the antenna further comprises a ground plane, and wherein the dielectric block is arranged generally centrally on the ground plane, and the plane of symmetry is generally perpendicular to the ground plane.

13. The antenna of claim 2, wherein the dielectric block is rotationally symmetric and reflectively symmetric.

14. The antenna of claim 2, wherein the dielectric block further comprises a through-hole formed in the body and arranged generally centrally of the body; and wherein the plurality of holes are disposed around the through-hole.

15. The antenna of claim 1, wherein the antenna further comprises a ground plane, and wherein the plurality of antenna elements are monopole antenna elements each respective operable as a monopole radiator.

16. The antenna of claim 1, wherein the antenna further comprises a plurality of feed ports each for a respective one of the plurality of antenna elements.

17. An antenna comprising:

a plurality of antenna elements each respectively operable as a radiator of electromagnetic waves; and a decoupler arrangement operably coupled with the plurality of antenna elements and configured to prevent, reduce, or substantially eliminate mutual coupling of all of the plurality of antenna elements when at least one of the plurality of antenna elements is operated as radiator of electromagnetic waves;

wherein the decoupler arrangement comprises a dielectric decoupler arrangement, the dielectric decoupler arrangement providing one or more boundaries operable to scatter electromagnetic waves provided by the plurality of antenna elements such that: for each respective one of the plurality of antenna elements, when the antenna element operates as radiator of electromagnetic waves, the dielectric decoupler arrangement defines one or more respective neutral locations that are less or substantially not susceptible to the corresponding electromagnetic waves provided by the radiator; and wherein the plurality of antenna elements are disposed at the neutral locations;

wherein the dielectric decoupler arrangement comprises a dielectric block that: receives or substantially encloses the plurality of antenna elements, and provides the one or more boundaries;

wherein the plurality of antenna elements comprises two antenna elements;

wherein the dielectric block comprises:

a body; and two holes formed in the body and arranged on an imaginary circle in plan view, wherein each of the two holes receives a respective one of the two antenna elements; and wherein the dielectric block is rotationally symmetric and reflectively symmetric.

18. An antenna comprising:

a plurality of antenna elements each respectively operable as a radiator of electromagnetic waves; and a decoupler arrangement operably coupled with the plurality of antenna elements and configured to prevent, reduce, or substantially eliminate mutual coupling of all of the plurality of antenna elements when at least one of the plurality of antenna elements is operated as radiator of electromagnetic waves;

wherein the decoupler arrangement comprises a dielectric decoupler arrangement, the dielectric decoupler arrangement providing one or more boundaries operable to scatter electromagnetic waves provided by the plurality of antenna elements such that: for each respective one of the plurality of antenna elements, when the antenna element operates as radiator of electromagnetic waves, the dielectric decoupler arrangement defines one or more respective neutral locations that are less or substantially not susceptible to the corresponding electromagnetic waves provided by the radiator; and wherein the plurality of antenna elements are disposed at the neutral locations; and wherein the dielectric decoupler arrangement comprises a dielectric block that receives or substantially encloses the plurality of antenna elements, and provides the one or more boundaries;

wherein the plurality of antenna elements comprises four antenna elements;

wherein the dielectric block comprises:

a body;

a through-hole formed in the body and arranged generally centrally of the body; and four holes formed in the body, the four holes are arranged on an imaginary circle and around the through-hole in plan view, wherein each of the four holes receives a respective one of the four antenna elements; and wherein the dielectric block is rotationally symmetric and reflectively symmetric.

19. The antenna of claim 18, wherein the body consists of two halves disposed about a plane of symmetry; and wherein each of the two halves respectively includes two of the four holes and half of the through-hole.

20. The antenna of claim 19, wherein the body is shaped as a right squared or rectangular prism with a first face diagonal and a second face diagonal in plan view; and wherein, in plan view, two of the four antenna elements are disposed on the first face diagonal and another two of the four antenna elements are disposed on the second face diagonal.

21. The antenna of claim 20, wherein the through-hole is shaped as a right squared or rectangular prism, which, in plan view, has a third face diagonal arranged at an acute angle to the first face diagonal and a fourth face diagonal arranged at an acute angle to the second face diagonal.

* * * * *